(12) United States Patent
Seo et al.

(10) Patent No.: US 7,609,939 B2
(45) Date of Patent: Oct. 27, 2009

(54) METHOD AND APPARATUS OF REPRODUCING DATA RECORDED ON RECORDING MEDIUM AND LOCAL STORAGE

(75) Inventors: Kang Soo Seo, Anyang-si (KR); Jea Yong Yoo, Seoul (KR); Byung Jin Kim, Seongnam-si (KR); Seung Hoon Lee, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 779 days.

(21) Appl. No.: 11/205,093

(22) Filed: Aug. 17, 2005

(65) Prior Publication Data
US 2006/0056802 A1 Mar. 16, 2006

Related U.S. Application Data

(60) Provisional application No. 60/601,993, filed on Aug. 17, 2004.

(30) Foreign Application Priority Data

Sep. 7, 2004 (KR) ............... 10-2004-0071365
Sep. 7, 2004 (KR) ............... 10-2004-0071366

(51) Int. Cl.
*G11B 27/00* (2006.01)
(52) U.S. Cl. ............... 386/55; 386/46; 386/95; 386/124
(58) Field of Classification Search ............... 386/46, 386/83, 95, 123–126, 52, 55
See application file for complete search history.

(56) References Cited

U.S. PATENT DOCUMENTS

| 5,644,782 A | 7/1997 | Yeates et al. |
| 5,930,768 A | 7/1999 | Hooban |
| 5,982,980 A | 11/1999 | Tada |

(Continued)

FOREIGN PATENT DOCUMENTS

CA 2373641 9/2001

(Continued)

OTHER PUBLICATIONS

European Search Report dated Sep. 17, 2008 corresponding to European Application No. 05823683.7.

(Continued)

*Primary Examiner*—Thai Tran
*Assistant Examiner*—Mishawn Dunn
(74) *Attorney, Agent, or Firm*—Harness, Dickey & Pierce

(57) ABSTRACT

An apparatus of reproducing data recorded on a recording medium includes a pick-up unit, a local storage, and a decoder. The pick-up unit reads main data recorded on the recording medium. The local storage stores sub data associated with the main data. The decoder decodes the main data and the sub data using a PlayList file which includes a main path and a sub path, where the main path contains a PlayItem for play-back of the main data, and the sub path contains at least one SubPlayItem associated with the PlayItem for play-back of the sub data in association with the play-back of the main data. The sub path may contain a single SubPlayItem or multiple SubPlayItems.

16 Claims, 30 Drawing Sheets

U.S. PATENT DOCUMENTS

| | | | |
|---|---|---|---|
| 6,021,438 | A | 2/2000 | Duvvoori et al. |
| 6,269,371 | B1 | 7/2001 | Ohnishi |
| 6,775,803 | B1 | 8/2004 | Chung et al. |
| 6,928,613 | B1 | 8/2005 | Ishii et al. |
| 7,308,189 | B2 | 12/2007 | Ando et al. |
| 2002/0161571 | A1 | 10/2002 | Matsushima et al. |
| 2003/0072453 | A1 | 4/2003 | Kelly et al. |
| 2003/0105743 | A1 | 6/2003 | Ireton |
| 2003/0190148 | A1 | 10/2003 | Lee |
| 2003/0202431 | A1 | 10/2003 | Kim et al. |
| 2003/0228134 | A1 | 12/2003 | Kim et al. |
| 2003/0235402 | A1 | 12/2003 | Seo et al. |
| 2003/0235406 | A1 | 12/2003 | Seo et al. |
| 2004/0047588 | A1 | 3/2004 | Okada et al. |
| 2004/0051812 | A1 | 3/2004 | Hayward |
| 2004/0054541 | A1 | 3/2004 | Kryze et al. |
| 2004/0081434 | A1 | 4/2004 | Jung et al. |
| 2004/0101285 | A1 | 5/2004 | Seo et al. |
| 2004/0184778 | A1 | 9/2004 | Jung et al. |
| 2004/0210584 | A1 | 10/2004 | Nir et al. |
| 2004/0235402 | A1 | 11/2004 | Bjelopavlic et al. |
| 2005/0025461 | A1 | 2/2005 | Kato et al. |
| 2005/0105888 | A1* | 5/2005 | Hamada et al. .............. 386/95 |
| 2005/0108466 | A1 | 5/2005 | Takashima et al. |
| 2005/0196142 | A1 | 9/2005 | Park et al. |
| 2005/0198071 | A1 | 9/2005 | Yoo et al. |
| 2005/0198115 | A1 | 9/2005 | Sugimoto et al. |
| 2006/0013562 | A1 | 1/2006 | Sugino et al. |
| 2006/0045481 | A1 | 3/2006 | Yahata et al. |
| 2006/0051062 | A1 | 3/2006 | Kusaka et al. |
| 2006/0140079 | A1 | 6/2006 | Hamada et al. |
| 2006/0143666 | A1 | 6/2006 | Okada et al. |
| 2006/0153535 | A1 | 7/2006 | Chun et al. |
| 2006/0227973 | A1 | 10/2006 | Takashima et al. |
| 2006/0282775 | A1 | 12/2006 | Yahata et al. |
| 2007/0217305 | A1 | 9/2007 | Seo et al. |

FOREIGN PATENT DOCUMENTS

| | | |
|---|---|---|
| CN | 1111873 | 11/1995 |
| CN | 1179589 | 4/1998 |
| CN | 1898742 A | 1/2007 |
| EP | 0 737 912 | 10/1996 |
| EP | 0 737 975 | 10/1996 |
| EP | 0 801 384 | 10/1997 |
| EP | 1 032 229 | 8/2000 |
| EP | 1 408 505 | 4/2004 |
| EP | 1426961 A1 | 6/2004 |
| EP | 1437737 A2 | 7/2004 |
| EP | 1 513 152 | 3/2005 |
| EP | 1 524 669 | 4/2005 |
| EP | 1 536 427 A1 | 6/2005 |
| EP | 1 553 769 | 7/2005 |
| EP | 1 718 074 | 11/2006 |
| JP | 11-065996 | 3/1999 |
| JP | 11-249948 | 9/1999 |
| JP | 11-249963 | 9/1999 |
| JP | 11-288580 | 10/1999 |
| JP | 2002288941 | 10/2002 |
| JP | 2004-214918 | 7/2004 |
| JP | 2006-040473 | 2/2006 |
| KR | 10-2004-0039885 | 5/2004 |
| RU | 2233011 | 7/2004 |
| TW | 583538 | 4/2004 |
| WO | WO 95/012197 | 5/1995 |
| WO | WO 96/11446 | 4/1996 |
| WO | WO 01/067668 | 9/2001 |
| WO | WO 2004/001752 | 12/2003 |
| WO | WO 2004/001754 | 12/2003 |
| WO | WO 2004/023479 | 3/2004 |
| WO | WO 2004/030356 | 4/2004 |
| WO | WO 2004/042723 | 5/2004 |
| WO | WO 2004/047100 | 6/2004 |
| WO | WO 2004/047104 | 6/2004 |
| WO | WO 2005/002220 | 6/2004 |
| WO | WO 2004/074976 | 9/2004 |
| WO | WO 2004/077436 | 9/2004 |
| WO | WO 2005/052941 | 9/2004 |
| WO | WO 2004/114658 | 12/2004 |
| WO | WO 2005/078727 | 2/2005 |
| WO | WO 2005/050528 | 6/2005 |
| WO | WO 2005/055205 | 6/2005 |
| WO | WO 2005/091637 | 9/2005 |
| WO | WO 2005/124763 | 12/2005 |

OTHER PUBLICATIONS

Chinese Office Action dated Aug. 8, 2008 corresponding to Chinese Application No. 200580031490.0.

European Search Report corresponding to European Application No. 05787044.6 dated Jan. 29, 2009.

International Search report for PCT/KR 2005/002696 dated Dec. 5, 2005.

International Search report for PCT/KR 2005/002698 dated Dec. 5, 2005.

International Search report for PCT/KR 2005/002704 dated Dec. 30, 2005.

International Search report for PCT/KR 2005/002700 dated Jan. 13, 2006.

Office Action for Chinese Application 1111873 dated May 8, 2009 and English translation thereof.

Office Action for Chinese Application 1179589 dated May 8, 2009 and English translation thereof.

Notice of Allowance for Russian Application 2233011 dated Apr. 28, 2009 and English translation thereof.

* cited by examiner

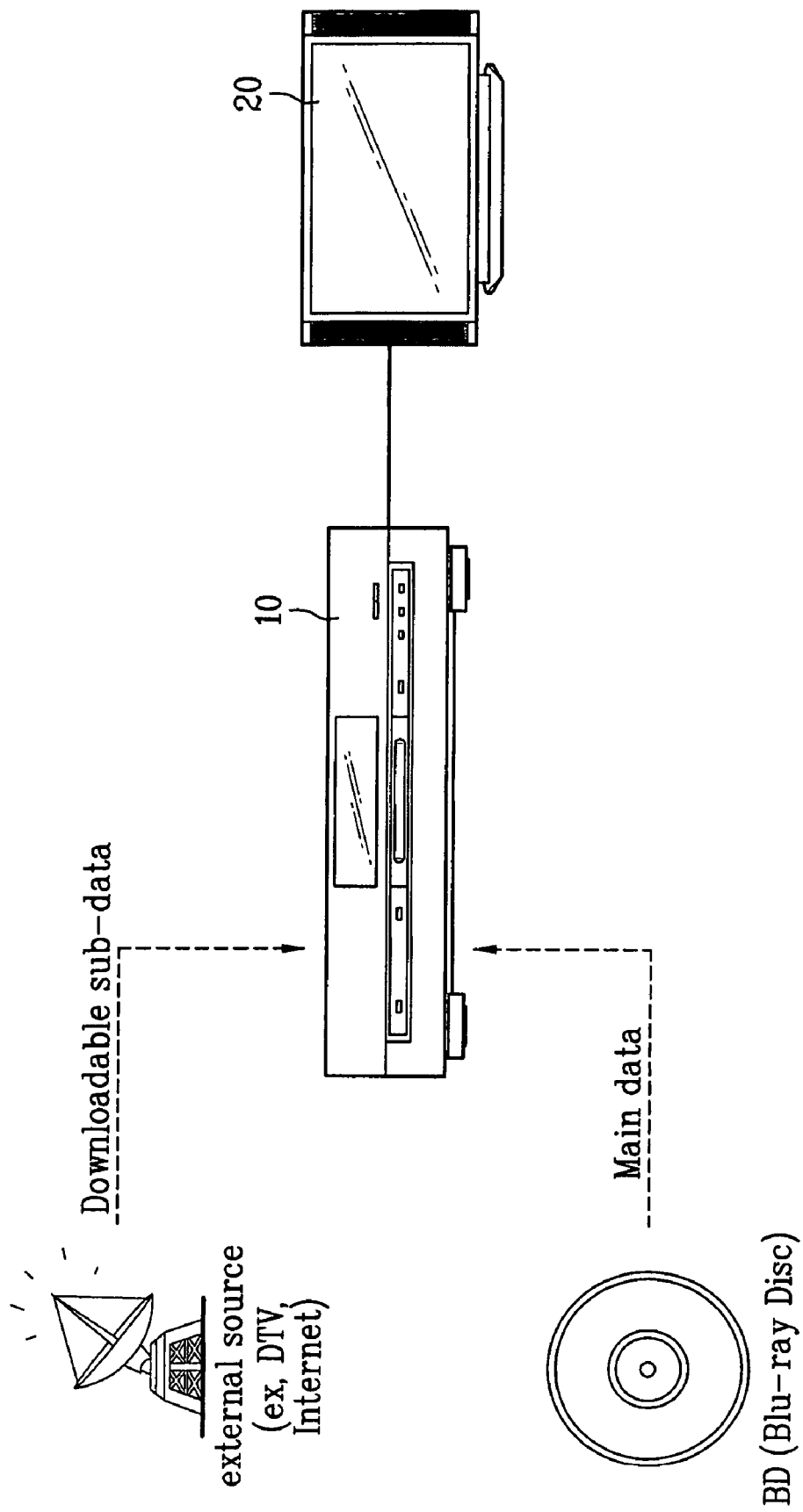

FIG. 10A

```
xxxxx.mpls{
    type_indicator
    version_number
    PlayList_start_address
    PlayListMark_start_address
    reserved_for_future_use
    AppInfoPlayList()
    for(i=0; i<N1; i++) {
            padding_word
    }
    PlayList()
    for(i=0; i<N2; i++) {
            padding_word
    }
    PlayListMark()
    for(i=0; i<N2; i++) {
            padding_word
    }
}
```

FIG. 10B

```
PlayList() {
    length
    reserved_for_future_use
    number_of_PlayItems
    number_of_SubPaths
    for (PlayItem_id=0;
         PlayItem_id<number_of_PlayItems;
         PlayItem_id++) {
             PlayItem() ← STN_table()
    }
    for(SubPath_id=0;
        SubPath_id<number_of_SubPaths;
        SubPath_id++) {
            SubPath()
    }
}
```

FIG. 10C

```
STN_table() {
  length
  reserved_for_future_use
  number_of_video_stream_entries
  number_of_audio_stream_entries
  number_of_PG_textST_stream_entries
  number_of_IG_stream_entries
  reserved_for_future_use
  for (video_stream_id=0;
        video_stream_id<number_of_video_stream_entries;
        video_stream_id++) {
      stream_entry()
      stream_attributes()
  } for (audio_stream_id=0;
        audio_stream_id<number_of_audio_ stream_entries;
        audio_stream_id++) {
      stream_entry()
      stream_attributes()
  } for (PG_textST_id=0;
       PG_textST_id<number_of_PG_textST_ stream_entries;
       PG_textST_stream_id++) {
      stream_entry()
      stream_attributes()
  } for (IG_stream_id=0;
       IG_stream_id<number_of_IG_stream_entries
       IG_stream_id++) {
      stream_entry()
      stream_attributes()
  }
}
```

FIG. 10D

```
stream_entry()
    length
    type
    if (type==1) {
            ref_to_stream_PID_of_mainClip
            reserved_for_future_ue
    } else if (type==2 or 3) {
        ref_to_SubPath_id
        ref_to_SubClip_entry_id
        ref_to_Stream_PID_of_subClip
        reserved_for_future_use
    }
}
``` type 1 : a stream of the clip used by the PlayItem
type 2 : a stream of the clip used by a SubPath associated with PlayItem.
type 3 : a stream of the clip used by a SubPath stored in local storage.

FIG. 10E

```
stream_attributes() {
  length
  stream_coding_type
  if(stream_doding_type==0x02) {
        reserved_for_future_use
        frame_rate
        reserved_for_future_use
  } else if (stream_coding_type==0x80 ||
        stream_coding_type==0x81 ||
        stream_coding_type==0x82) {
        audio_presentation_type
        reserved_for_future_use
        audio_language_code
  } else if (stream_coding_type==0x90) {
                //Presentation graphics stream
        PG_languge_code
  } else if (stream_coding_type==0x91) {
                //Interactive graphics stream
        IG_languge_code
  } else if (stream_coding_type==0x92) {
                //Text subtitle stream
        character_code
        reserved_for_future_use
        textST_language_code
  }
}
```

FIG. 10F

```
SubPath() {
    length
    reserved_for_future_use
    SubPath_type
    reserved_for_future_use
    is_repeat_SubPath
    reserved_for_future_use
    number_of_SubPlayItems
    for (i=0; i<number_of_SubPlayItems; i++) {
        SubPlayItem(i)
    }
}
```

SubPath_type (n: recorded in disc, m: stored in local storage)
- n1 : Audio presentation path
- n2 : Text subtitle presentation path
- n3 : Interactive graphics presentation path
- n4 : Presentation graphics presentation path
- m1 : Audio presentation path
- m2 : Text subtitle presentation path
- m3 : Interactive graphics presentation path
- m4 : Presentation graphics presentation path

FIG. 10G

```
SubPlayItem(i) {
    length
    Clip_Iformation_file_name
    reserved_for_future_use
    ref_to_STC_id
    SubPlayItem_IN_time(1)
    SubPlayItem_OUT_time(1)
    SubPlayItem_IN_time(2)
    SubPlayItem_OUT_time(2)
    SubPlayItem_IN_time(k)
    SubPlayItem_OUT_time(k)
    sync_PlayItem_id
    sync_start_PTS_of_PlayItem
}
```

METHOD AND APPARATUS OF REPRODUCING DATA RECORDED ON RECORDING MEDIUM AND LOCAL STORAGE

This application claims the benefit of U.S. Provisional Application No. 60/601,993, filed on Aug. 17, 2004, in the name of inventors Kang Soo SEO, Jae Yong Yoo, Byung Jin KIM, and Seung Hoon LEE, entitled "METHOD OF CONFIGURING MANAGEMENT FILE IN BLU-RAY DISC", which is hereby incorporated by reference as if fully set forth herein.

This application claims the benefit of the Korean Patent Application No. 10-2004-0071365, filed on Sep. 7, 2004, and No. 10-2004-0071366, filed on Sep. 7, 2004, which are hereby incorporated by reference as if fully set forth herein.

BACKGROUND OF THE INVENTION

1. Field of the Invention

The present invention relates to a recording medium, and more particularly, to a method and apparatus of reproducing data recorded on a recording medium and a local storage.

2. Discussion of the Related Art

Optical discs are widely used as a recording medium for recording mass data. Presently, among a wide range of optical discs, a new high density optical recording medium, such as a blu-ray disc (hereinafter referred to as "BD"), is under development for recording (or writing) and storing high definition video and audio data for a long period of time. Currently, global standard technical specifications for the blu-ray disc (BD), which is known to be the next generation recording medium technology, are under development as a next generation optical recording solution that is capable of having data significantly surpassing the conventional DVD, along with many other digital apparatuses. Accordingly, an optical recording and reproducing apparatus adopting the Blu-ray disc (BD) standard is also under development. However, since the blu-ray disc (BD) standard is not yet fully completed, there lie many difficulties in developing a complete optical recording and reproducing apparatus.

Most particularly, in the above-described optical recording and/or reproducing apparatus, the basic function(s) of recording and/or reproducing the blu-ray disc (BD), as well as additional functions taking into account a combined usage with related peripheral digital apparatuses are/is being considered. Thus, generally, the optical recording and/or reproducing apparatus must be provided with functions of either receiving external input signals and displaying the received signals, or applying external input signals with a built-in blu-ray disc (BD) playback signal for reproduction (or presentation or play-back).

However, since a consolidated standard for achieving the above-described additional functions is not yet provided in the current blu-ray disc (BD) standard, there lie many difficulties in developing a full-scale blu-ray disc (BD)-based optical recording and reproducing apparatus. More specifically, a problem may occur in seeking to reproduce both the data existing outside of the recording medium and the data recorded within the recording medium (e.g., blu-ray disc) as a single reproducing unit.

SUMMARY OF THE INVENTION

Accordingly, the present invention is directed to a method and apparatus of reproducing data recorded on a recording medium and a local storage that substantially obviate one or more problems due to limitations and disadvantages of the related art.

An object of the present invention is to provide a method of configuring a reproduction management file for reproducing both data recorded within the high density recording medium and data stored in a local storage.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of reproducing data recorded on a recording medium includes reproducing main data recorded on the recording medium and sub data stored in a local storage using a PlayList file which includes a main path and a sub path, wherein the main path contains a PlayItem for play-back of the main data, and the sub path contains at least one SubPlayItem associated with the PlayItem for play-back of the sub data in association with the play-back of the main data.

In another aspect of the present invention, a method of reproducing data recorded on a recording medium includes reproducing main data recorded on the recording medium and associated sub data stored in a local storage using a PlayList file which includes a main path and a sub path, wherein the main path contains a plurality of PlayItems for play-back of the main data, and the sub path contains at least one SubPlayItem associated with the PlayItems for play-back of the sub data in association with the play-back of the main data.

In another aspect of the present invention, a method of reproducing data recorded on a recording medium includes reproducing main data recorded on the recording medium and sub data stored in a local storage using a PlayList file which includes a main path and a plurality of sub paths, wherein the main path contains a PlayItem for play-back of the main data, and each sub path contains at least one SubPlayItem associated with the PlayItem for play-back of the sub data in association with the play-back of the main data.

In another aspect of the present invention, an apparatus of reproducing data recorded on a recording medium includes a pick-up unit for reading main data recorded on the recording medium, a local storage for storing sub data associated with the main data, and a decoder for decoding the main data and the sub data using a PlayList file which includes a main path and a sub path, wherein the main path contains a PlayItem for play-back of the main data, and the sub path contains at least one SubPlayItem associated with the PlayItem for play-back of the sub data in association with the play-back of the main data.

In another aspect of the present invention, an apparatus of reproducing data recorded on a recording medium includes a pick-up unit for reading main data recorded on the recording medium, a local storage for storing sub data associated with the main data, and a decoder for decoding the main data and the sub data using a PlayList file which includes a main path and a sub path, wherein the main path contains a plurality of PlayItems for play-back of the main data, and the sub path contains at least one SubPlayItem associated with the PlayItems for play-back of the sub data in association with the play-back of the main data.

In a further aspect of the present invention, an apparatus of reproducing data recorded on a recording medium includes a pick-up unit for reading main data recorded on the recording medium, a local storage for storing sub data associated with the main data, and a decoder for decoding the main data and the sub data using a PlayList file which includes a main path and a plurality of sub paths, wherein the main path contains a PlayItem for play-back of the main data, and each sub path contains at least one SubPlayItem associated with the PlayItem for play-back of the sub data in association with the play-back of the main data.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 illustrates a general view of the present invention;

FIGS. 10A to 10G illustrate syntaxes of the reproduction management file according to the present invention.

DETAILED DESCRIPTION OF THE INVENTION

Figure 2A:
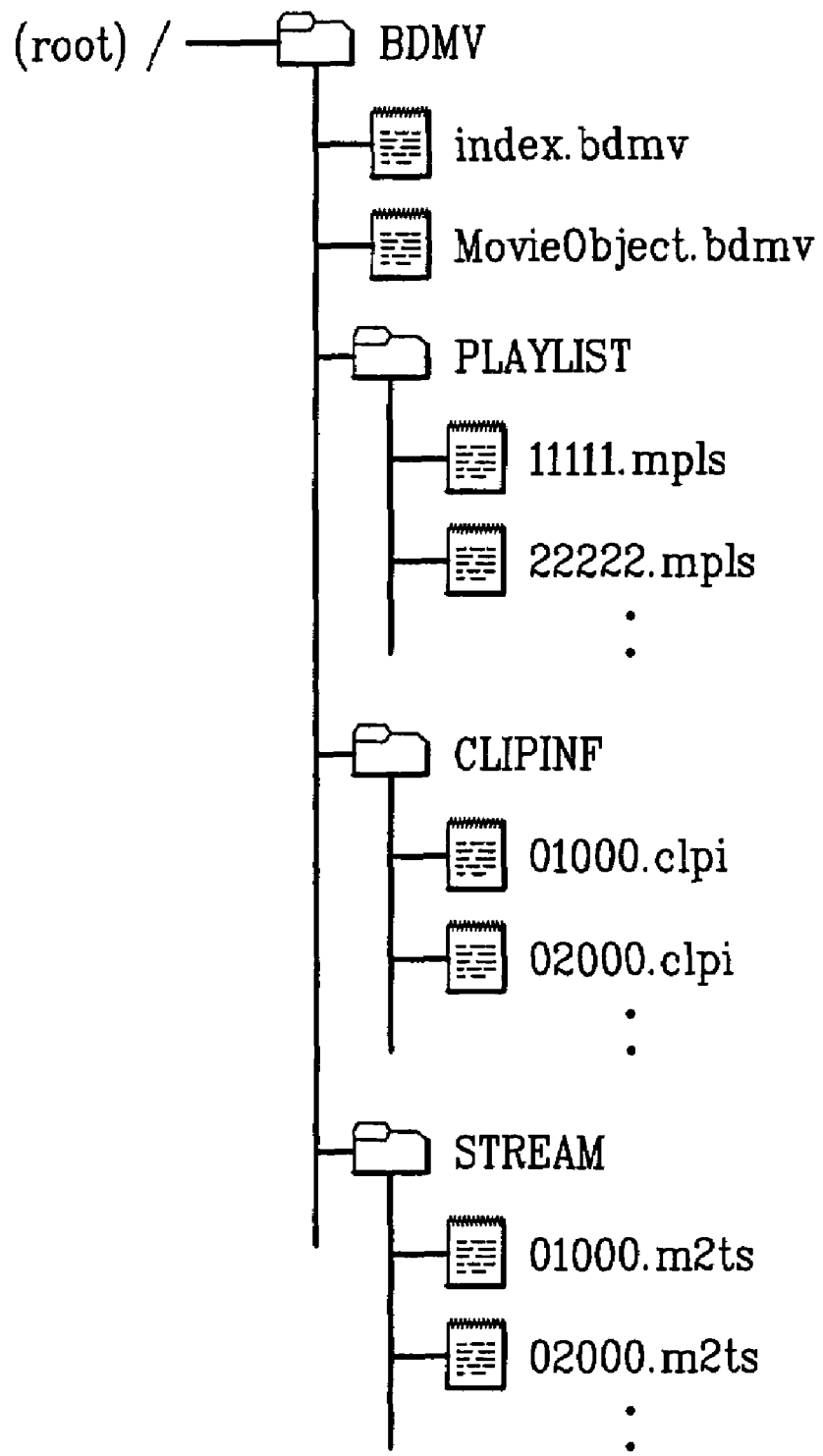
FIGS. 2A and 2B illustrate a file structure that is recorded in the present invention and a structure of a PlayList file, which is a reproduction management file, for reproducing the recorded file structure.

Reference will now be made in detail to the preferred embodiments of the present invention, examples of which are illustrated in the accompanying drawings. Wherever possible, the same reference numbers will be used throughout the drawings to refer to the same or like parts. In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

According to the present invention, a "reproduction management file" refers to a management file for reproducing both data recorded on the recording medium and data stored in a local storage. More specifically, in the blu-ray disc (BD) the reproduction management file is referred to as a "PlayList". A detailed description of the reproduction management file will be made with reference to FIG. 2A and FIG. 2B along with the description of the overall file structure. In other words, although the "PlayList" refers to the reproduction management file in the present invention, it is apparent that a different terminology may be used for a recording medium of a different standard other than the Blu-ray disc (BD). However, it is also apparent that the technical scope of other recording media does not depart from the scope or spirit of the present invention.

FIG. 1 illustrates a general view of the present invention. More specifically, FIG. 1 illustrates an example of a combined usage of an optical recording and/or reproducing apparatus 10 and other peripheral apparatuses. Accordingly, the "optical recording and/or reproducing apparatus 10" can record and/or reproduce data on/from optical discs of various standards. Depending upon its design, the apparatus can record/reproduce data on/from an optical disc of a specific standard (e.g., blu-ray disc (BD)) only, or the apparatus can only reproduce data from the optical disc. However, considering the fact that the blu-ray disc (BD) standard is expected to be completed and the association of the blu-ray disc (BD) with other peripheral devices, a Blu-ray disc Player (BD-Player), which reproduces the data recorded on the blu-ray disc (BD), or a Blu-ray disc Recorder (BD-Recorder), which records data on the blu-ray disc (BD), will be given as the example for the optical recording and/or reproducing apparatus 10 according to the present invention. It is also apparent that the "optical recording and/or reproducing apparatus 10" can be referred to as a "driver" which may be equipped in computers.

Apart from the function of recording and/or reproducing the optical disc, the optical recording and/or reproducing apparatus 10 according to the present invention also has the function of receiving an external input signal and processing the received signal and providing the signal to a viewer by transmitting the processed signal onto a screen through a display 20. In this case, there is no limitation for the external signal that can be inputted. Nevertheless, the most common external input signal is a digital broadcast program (DTV) or the Internet. Most particularly, since the Internet is a medium that can be easily accessed by the public, users can make use of specific data provided on the Internet by downloading such data through the optical recording and/or reproducing apparatus 10. The present invention seeks to efficiently reproduce data by combining main data and sub data, when the main data is recorded in the optical disc (i.e., BD), which is loaded in the optical recording and/or reproducing apparatus 10, and when the sub data that is associated with the main data exists in an external source, such as the Internet.

For simplicity of the description of the present invention, the "main data" refers to the signal recorded within the optical disc, and the "sub data" refers to the signal existing in an external source outside of the optical disc. However, the terminologies are only based on the method of acquiring the data, and the main data and the sub data do not limit the data to only specific types of data. Accordingly, the main data generally includes audio data, presentation graphic (PG) data, text subtitle, interactive graphic (IG) data, and so on. And, without being limited to the above-mentioned examples, other types of data existing in an external source, which are associated with the main data, may be used as the sub data.

More specifically, when a video stream and an audio stream (e.g., in Korean) for a specific film are recorded as the main data on the optical disc, and when an audio stream of a different language (e.g., in English) for the film exists on the Internet as the sub data, a user may wish to download the audio stream (in English), which is the sub data existing on the Internet and reproduce the downloaded audio stream (in English) along with the video stream within the main data. In order to meet with the demands of the user, an association between the main data and the sub data needs to be determined, and a systematic method for managing (or controlling) and reproducing such data as desired by the user is also required. The present invention seeks to provide a method for resolving such requirements.

In order to meet with the demands of the user, a file structure associating the main data and the sub data is required, which will be described in detail with reference to FIGS. 2A to 3. FIGS. 2A and 2B and FIG. 3 illustrate a file structure and a data recording structure that can be applied to the recording medium according to the present invention.

Referring to FIG. 2A, which illustrates a file structure for controlling information recorded within the disc, at least one BD directory (BDMV) is included in a root directory (root). Each BD directory includes an "index.bdmv" and a "MovieObject.bdmv", which represent general files that are used when interacting with one or more users. Each BD directory includes three file directories including data to be reproduced, and information required for reproducing the data. The file directories included in each BD directory are a stream directory (STREAM), a playlist directory (PLAYLIST), and a clip information directory (CLIPINF).

The stream directory includes audio/video (AV) stream (hereinafter referred to as "AV stream") files. More specifically, the AV streams (01000.m2ts, 02000.m2ts) may generally be in the form of MPEG2 transport packets and be named as "*.m2ts". In the BD standard, the AV stream is referred to as a clip file, and in the description of the present invention, the "main data" and the "sub data" will be formed as AV stream files. Further, the clip information directory (CLIPINF) includes clip information files (01000.clpi, 02000.clpi) being in one-to-one correspondence with the AV stream files (clip files) included in the stream directory.

A clip information file (*.clpi) includes property information and timing information of a corresponding AV stream. More specifically, the timing information includes mapping information that maps presentation time stamp (PTS) with source packet number (SPN) using entry point map. In the BD standard, each pair of an AV stream (*.m2ts) and its corresponding clip information file (*.clpi), which are in one-to-one correspondence with one another, is designated as a clip. For example, 01000.clpi included in CLIPINF includes the property and timing information of 01000.m2ts included in STREAM, and 01000.clpi and 01000.m2ts form a clip (Clip). In the present invention, a "Main clip" refers to a clip associated with the main data, and the "Sub clip" refers to a clip associated with the sub data.

Referring back to FIG. 2A, the playlist directory (PLAYLIST) includes one or more PlayList files (*.mpls), wherein each PlayList file (*.mpls) includes at least one PlayItem which designates playing interval for a specific clip. More specifically, a PlayItem includes information designating presentation start and end times (In-Time and Out-Time) of a specific clip, which may be designated by clip_Information_File_name within the PlayItem. Accordingly, a PlayList file (*.mpls) represents a reproduction management control file for reproducing (or playing-back) a desired clip from a combination of one or more PlayItems.

Figure 2B:
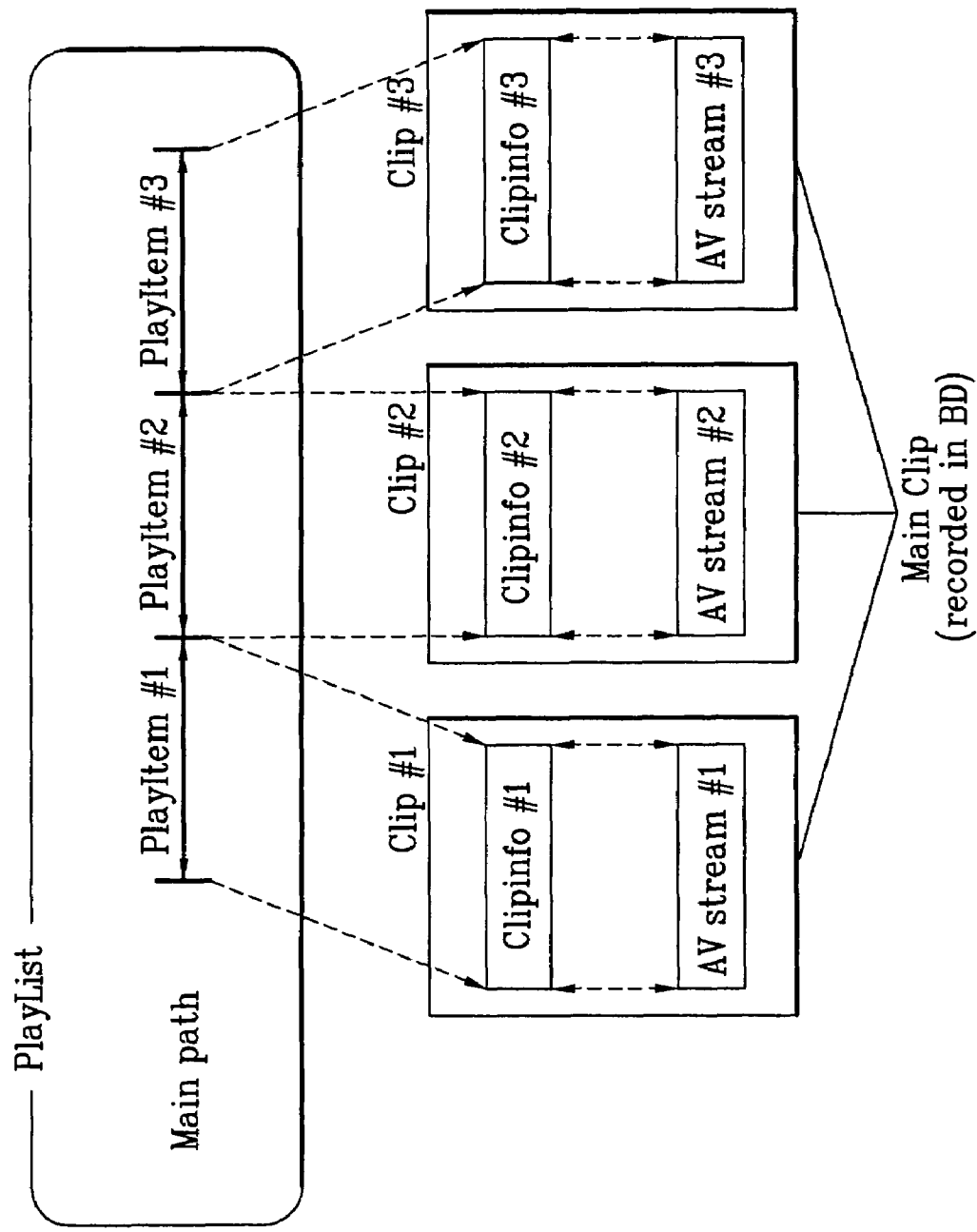
Figure 3:
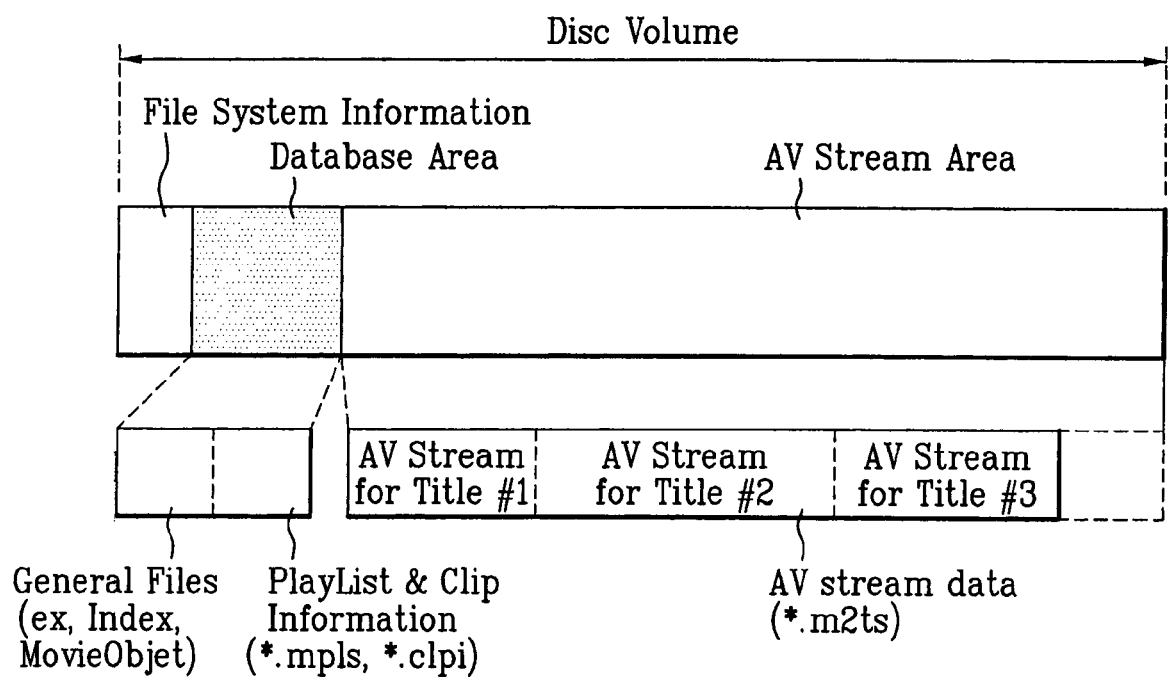
FIG. 3 illustrates a recording structure of data recorded on the recording medium according to the present invention.

Accordingly, FIG. 2B illustrates a relation (or association) between the PlayList file and the main clip. More specifically, the PlayList file includes a main path having at least one PlayItem, and each of the PlayItems includes a reproduction (or playback) management information for reproducing (or playing-back) a specific main clip (Clip #1, Clip #2, Clip #3). Accordingly, when reproducing (or playing-back) the PlayList of FIG. 2B, AV stream #1 within main clip #1 is reproduced by PlayItem #1. In succession, AV stream #2 within main clip #2 is then reproduced by PlayItem #2, and AV stream #3 within main clip #3 is reproduced by PlayItem #3.

FIG. 3 illustrates a general structure of information (or data) associated with the file structure that are recorded on the optical disc according to the present invention. More specifically, starting from the inner circumference (or center) of the disc, the disc volume includes a file system information area occupying the inmost portion of the disc volume, an AV stream area occupying the outmost portion of the disc volume, and a database area occupied between the file system information area and the stream data area. In the file system information area, system information for controlling the entire data files is recorded. And, main data such as audio/video/graphic data are recorded in the AV stream area. The general files, PlayList files, and clip information files are recorded in the database area of the disc volume. Most particularly, as described above, the data recorded in the AV stream area within the disc is referred to as the main data. Therefore, by using the information within the database area, a user is able to select an AV stream, which the user desires to reproduce, and decide and use the appropriate reproducing method of the selected AV stream.

Figure 4:
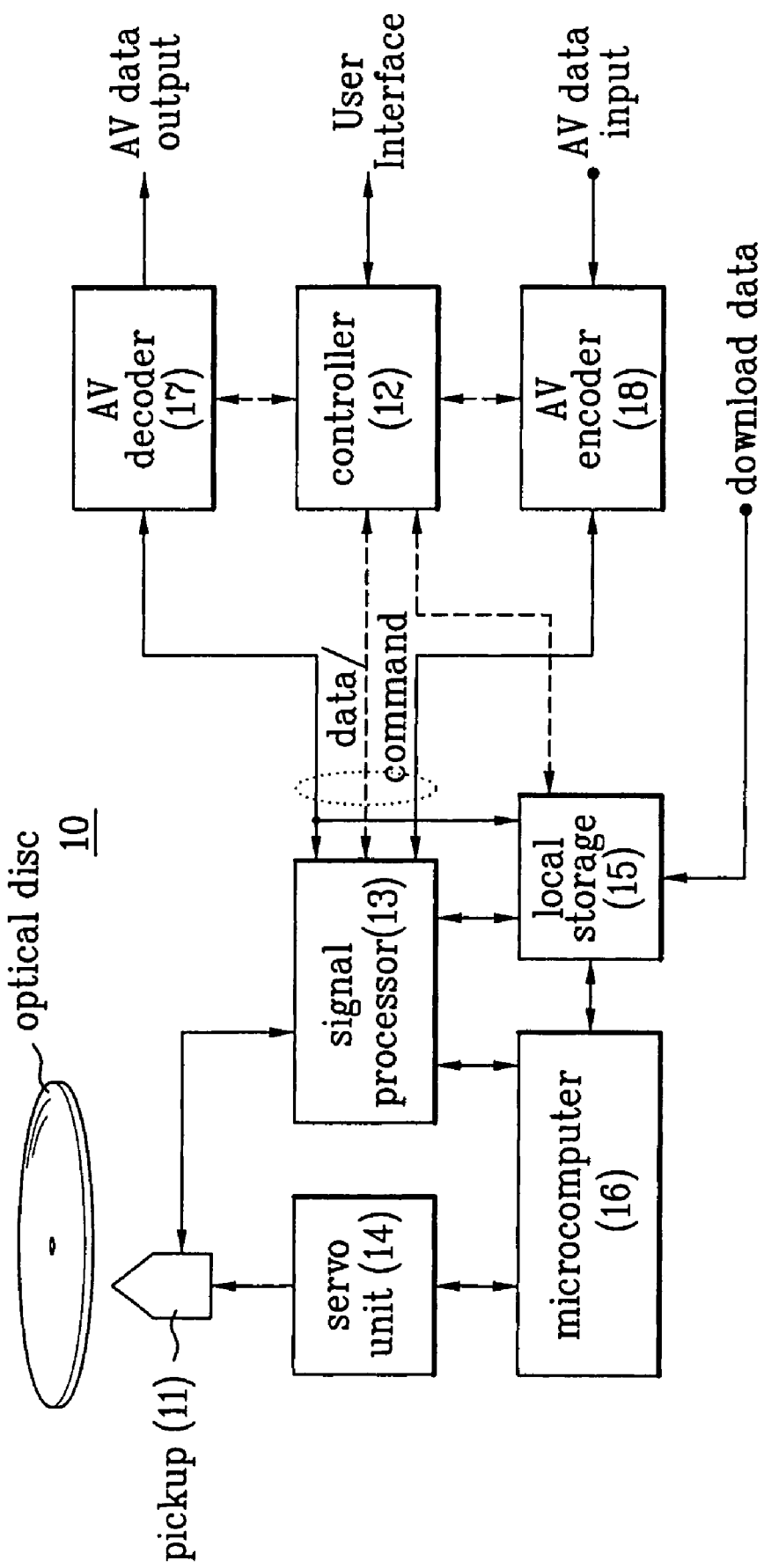
FIG. 4 illustrates an optical recording and/or reproducing apparatus according to the present invention.

The present invention relates to a method for reproducing (or playing-back) the main data recorded in the optical disc and the sub data existing within an external source in combination. Hereinafter, various examples of the present invention will be described with reference to the accompanying drawings. FIG. 4 illustrates an optical recording and/or reproducing apparatus 10 according to the present invention. The optical recording and/or reproducing apparatus 10 basically includes a pick-up unit 11 for reproducing the control information including the main data and the file information recorded on the optical disc, a servo 14 controlling the operations of the pick-up unit 11, a signal processor 13 either recovering the playback signal received from the pick-up unit 11 to a desired signal value, or modulating a signal to be recorded to an optical disc recordable signal and transmitting the modulated signal, and a microcomputer 16 controlling the above operations.

In addition, a controller 12 downloads the sub data existing in an external source according to a user command and stores the downloaded sub data in a local storage 15. The controller 12 then creates a new composite PlayList for reproducing the main data recorded within the optical disc and the sub data stored in the local storage 15. Thereafter, in accordance with the user command, the controller 12 reproduces the main data and the sub data by using the composite PlayList. An AV decoder 17 performs a final decoding of an output data (i.e., the main data and/or the sub data) in accordance with the control of the controller 17 and provides the decoded data to the user. Moreover, in order to record a signal within the optical disc, an AV encoder 18 converts an input signal to a specific format signal (e.g., an MPEG2 transport stream) according to the control of the controller 12 and provides the converted signal to the signal processor 13.

The local storage 15 storing the sub data may also be configured, for example, as a hard disc drive (HDD). And, the newly created composite PlayList may either be stored in the local storage 15 for future usage or be temporarily stored in a separate dynamic memory and used. As an example of the present invention, the optical recording and/or reproducing apparatus separately creates the new composite PlayList. In another example, when downloading the sub data and storing the downloaded sub data, the composite PlayList may also be downloaded and stored. In this case, the optical recording and/or reproducing apparatus 10 is not required to create another separate composite PlayList.

Furthermore, if the user desires to store the sub data and the composite PlayList in the local storage 15 for further usage, it is preferable to put more priority in using the PlayList recorded within the optical disc, which manages only the main data. Hereinafter, the method for creating the composite PlayList will now be descried in detail with reference to FIG. 6A to FIG. 7D.

Figure 5A:
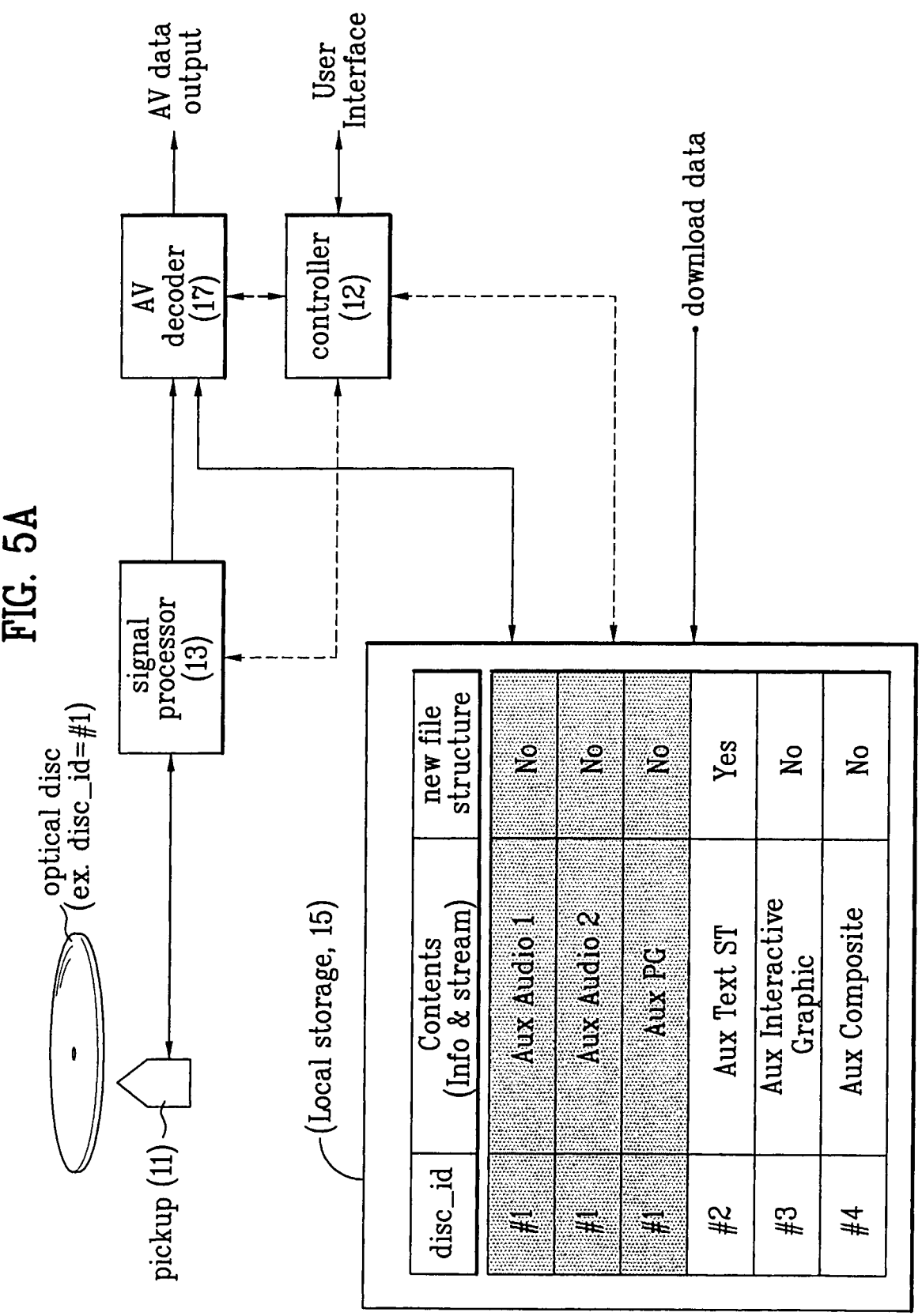
FIGS. 5A and 5B illustrate a method and apparatus for reproducing data recorded within the recording medium and data stored in a local storage according to the present invention.
Figure 5B:
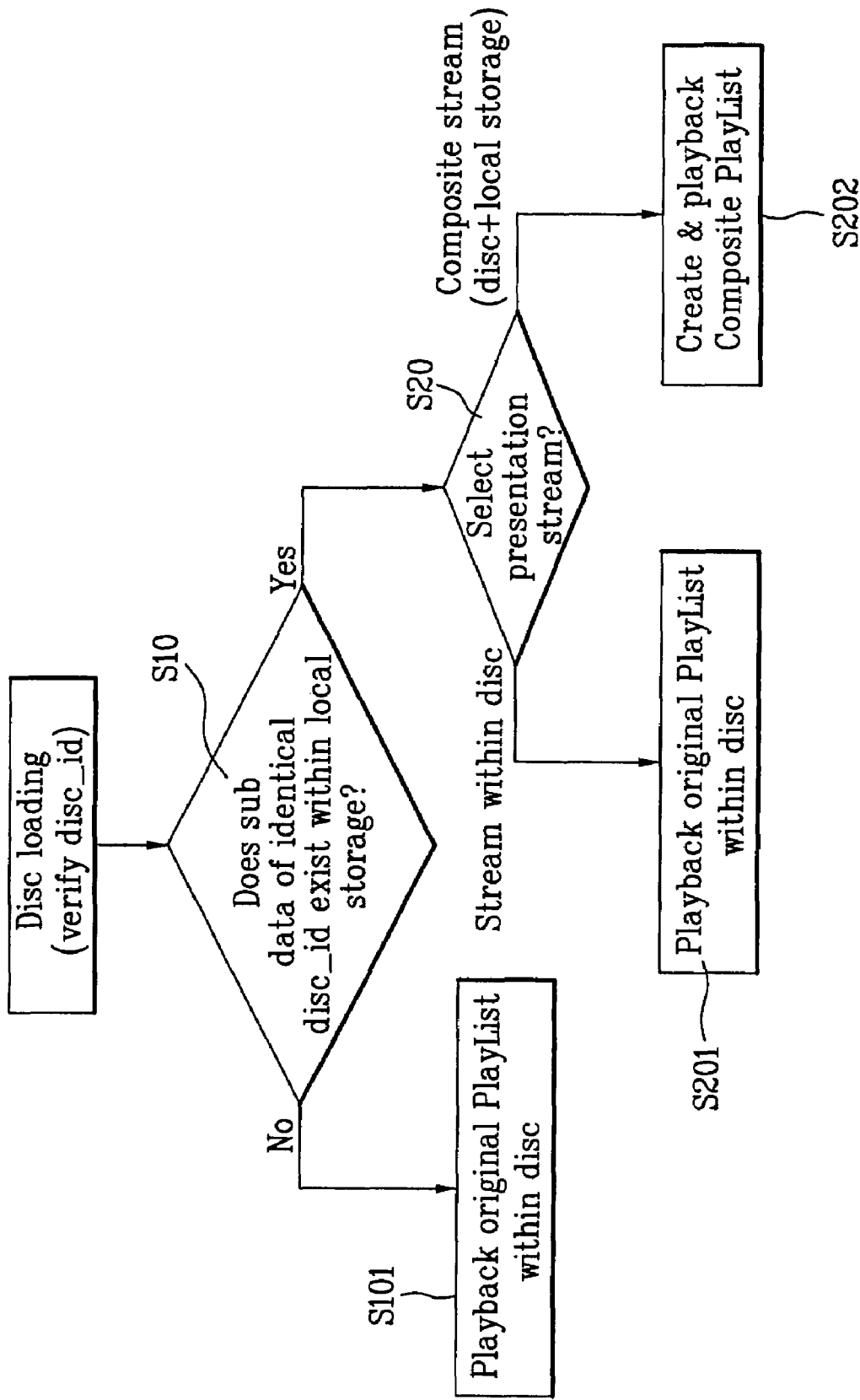

Among the structure of the optical recording and/or reproducing apparatus 10 according to the present invention shown in FIG. 4, FIG. 5A and FIG. 5B illustrate an apparatus for reproducing data and a method for reproducing data, respectively. More specifically, when an optical disc having a disc identification (disc_id) of #1, i.e., disc_id=#1, is loaded, the controller 12 of the optical recording and/or reproducing apparatus 10 verifies the identification of the corresponding disc by using the pick-up unit 11 and the signal processor 13. Then, the controller 12 verifies whether a set of sub data associated with "disc_id=#1" exists among the sub data stored in the local storage 15 (S10).

For example, if a first auxiliary audio stream (Aux Audio 1), a second auxiliary audio stream (Aux Audio 2), and an auxiliary presentation graphic stream (Aux PG) exist within the local storage 15 for the "disc_id=#1", the controller 12 selects a reproduction (or playback) stream in accordance with a user's request or system settings (S20). In other words, the controller 12 may notify the user that the sub data exists, and then the controller 12 may either reproduce only the main data recorded in the disc or select and reproduce the composite PlayList including the sub data within the local storage, in accordance with the user command or system settings. Therefore, when the user wishes to combine and reproduce the main data recorded in the optical disc and the sub data stored in the local storage 15, the controller 12 creates a reproduction management file for managing reproduction of the combined data, such as a composite PlayList file, and uses the newly created reproduction management file to reproduce the data (S202).

Accordingly, the newly created composite PlayList file is stored in the local storage 15, which can be used again when reproducing the sub data in a later process. FIG. 5A illustrates an example of a composite PlayList file being already stored in the local storage 15 in order to reproduce a text subtitle stream, which is the sub data for "disc_id=#2". Therefore, when the optical disc having the disc ID of "disc_id=#2" is loaded in the optical recording and/or reproducing apparatus 10, the composite PlayList that is already stored in the local storage 15 is used, and reproduction of data can be immediately performed without having to create a new composite PlayList. Furthermore, as described above, the composite PlayList may also be downloaded and used. Hereinafter, preferred embodiments of the inner structure of the reproduction management files according to the present invention will now be described in detail with reference to FIG. 6A to FIG. 9D.

Figure 9A:
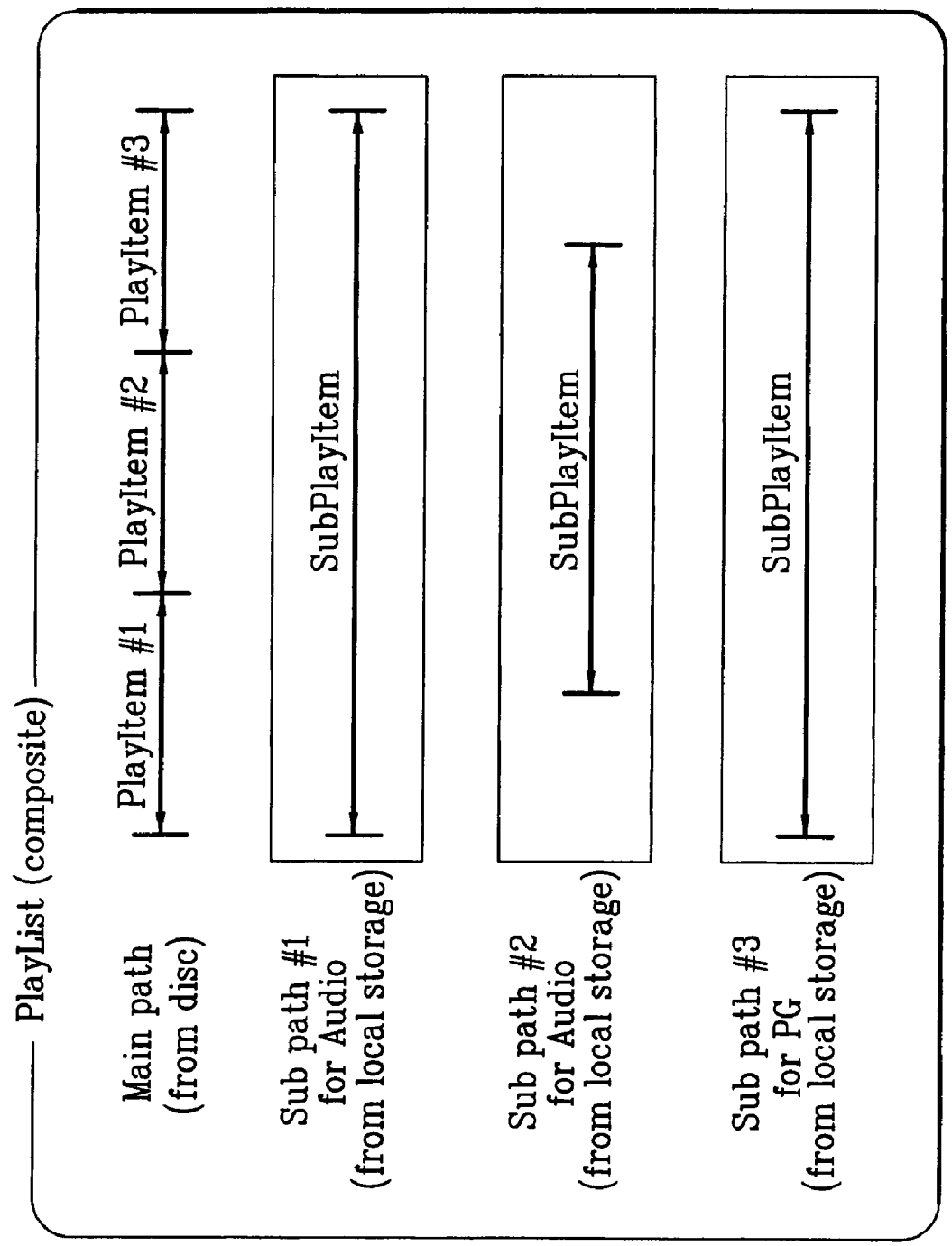
FIGS. 9A to 9D illustrate other examples of configuring a SubPath, among the methods of configuring the reproduction management files according to the present invention.
Figure 9B:
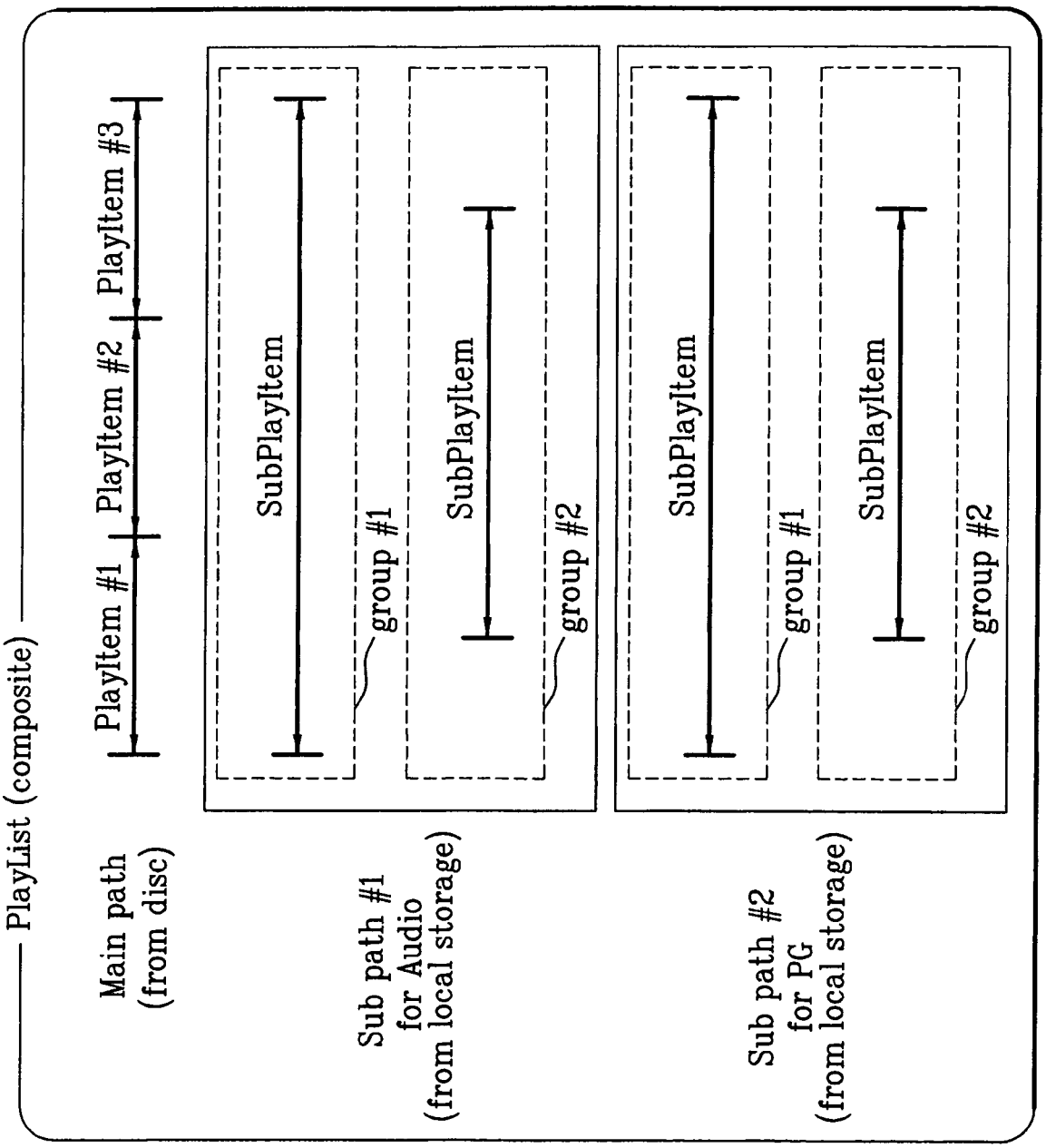
Figure 9C:
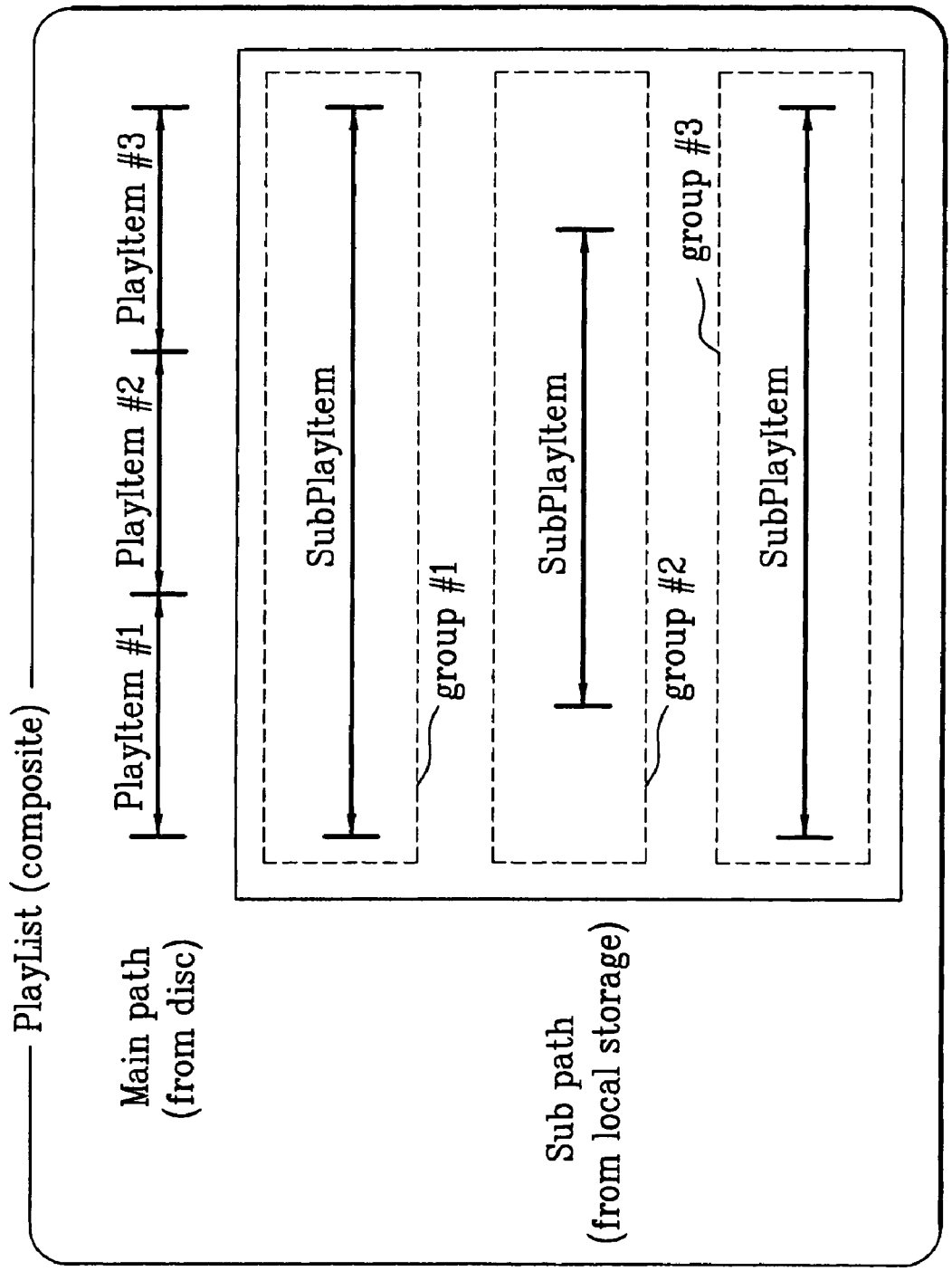

The characteristics common to all embodiments for configuring the reproduction management files (e.g., the PlayList) according to the present invention will now be described. The file information for reproducing the main data and the sub data in combination is included in the PlayList file. Herein, the main data is reproduced by at least one PlayItem included in the main path within the PlayList file. And, the sub data is reproduced by a SubPlayItem included in the sub path within the PlayList file. In addition, the SubPlayItem included in the sub path for the sub data is either associated with each PlayItem included in the main path (as shown in FIG. 6A to FIG. 6E) or associated with an entire PlayList reproduction (or playback) section within the main path (as shown in FIG. 9A to FIG. 9C).

Further, the auxiliary audio stream (AUX Audio) or the auxiliary Presentation Graphic (PG) stream is appropriate to be used as the sub data in the present invention. More specifically, the auxiliary stream within the sub data may be configured in a language different from the main stream included in the main data. Alternatively, even if the sub data is configured in the same language as the main stream, the sub data may be configured to have a different attribute. Such attribute may include a difference in channel number, a difference in coding type, and so on. In addition, even if the auxiliary stream is configured in the language identical to that of the main stream included in the main data, the contents of the auxiliary stream may be configured differently. Accordingly, in the description of the present invention, the auxiliary audio stream and the auxiliary presentation graphic stream will be given as examples of the sub data.

Finally, when configuring the composite PlayList according to the present invention, the related information should be stored in the local storage 15. More specifically, the related information is prepared in advance by the author of the disc and downloaded along with the sub data. Accordingly, the "Info" that is stored in the local storage 15, as shown in FIG. 5A, represents the information for configuring the composite PlayList.

Figure 6A:
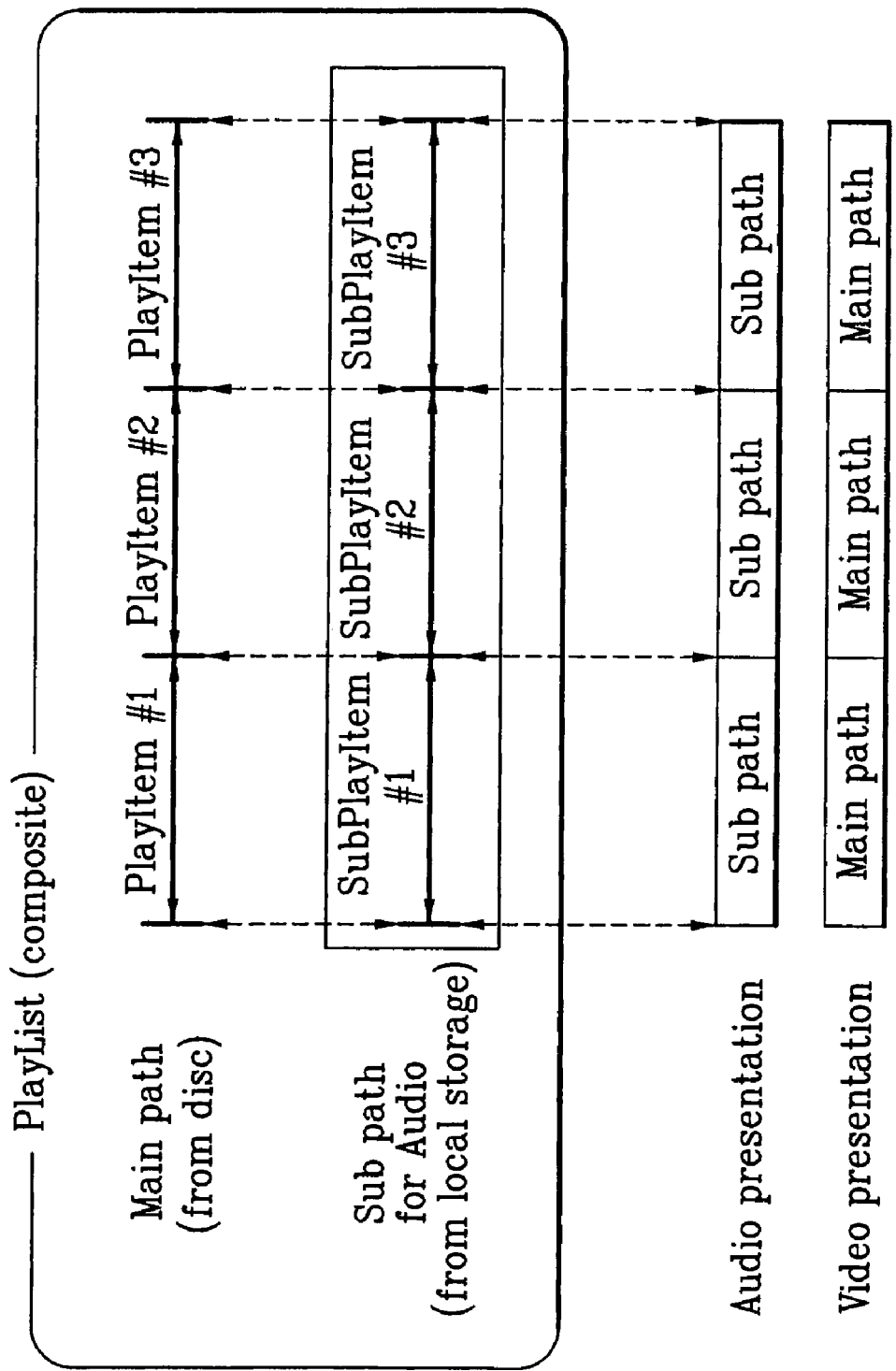
FIGS. 6A to 6E illustrate examples of configuring a SubPlayItem, among the methods of configuring the reproduction management files according to the present invention.

FIGS. 6A to 6E and FIGS. 7A to 7D illustrate embodiments of the SubPlayItem within the composite PlayList being associated with each of the PlayItems, among the method of configuring the composite PlayList. Accordingly, FIGS. 6A to 6E illustrate examples of configuring a SubPlayItem, among the methods of configuring the composite PlayList according to the present invention. Referring to FIG. 6A, in configuring the SubPlayItem within the sub path, the SubPlayItem, which is matched by one-to-one correspondence with each PlayItem within the main path, is configured independently.

More specifically, by designating a SubPlayItem simultaneously corresponding to all of the PlayItems within the PlayList, a main audio stream that is included in a main clip and designated by each PlayItem may be replaced with the auxiliary audio stream that is included in a sub clip and designated by each of the corresponding SubPlayItems. This simplifies the system and facilitates the management of each PlayItem. Therefore, when reproducing the optical disc using the above-described composite PlayList, the video signal is reproduced from the main video stream recorded within the disc, and the audio signal is reproduced from the auxiliary audio stream that is recorded in the local storage 15. In other words, the main audio stream recorded within the optical disc is replaced with the auxiliary audio stream stored in the local storage 15.

Figure 6B:
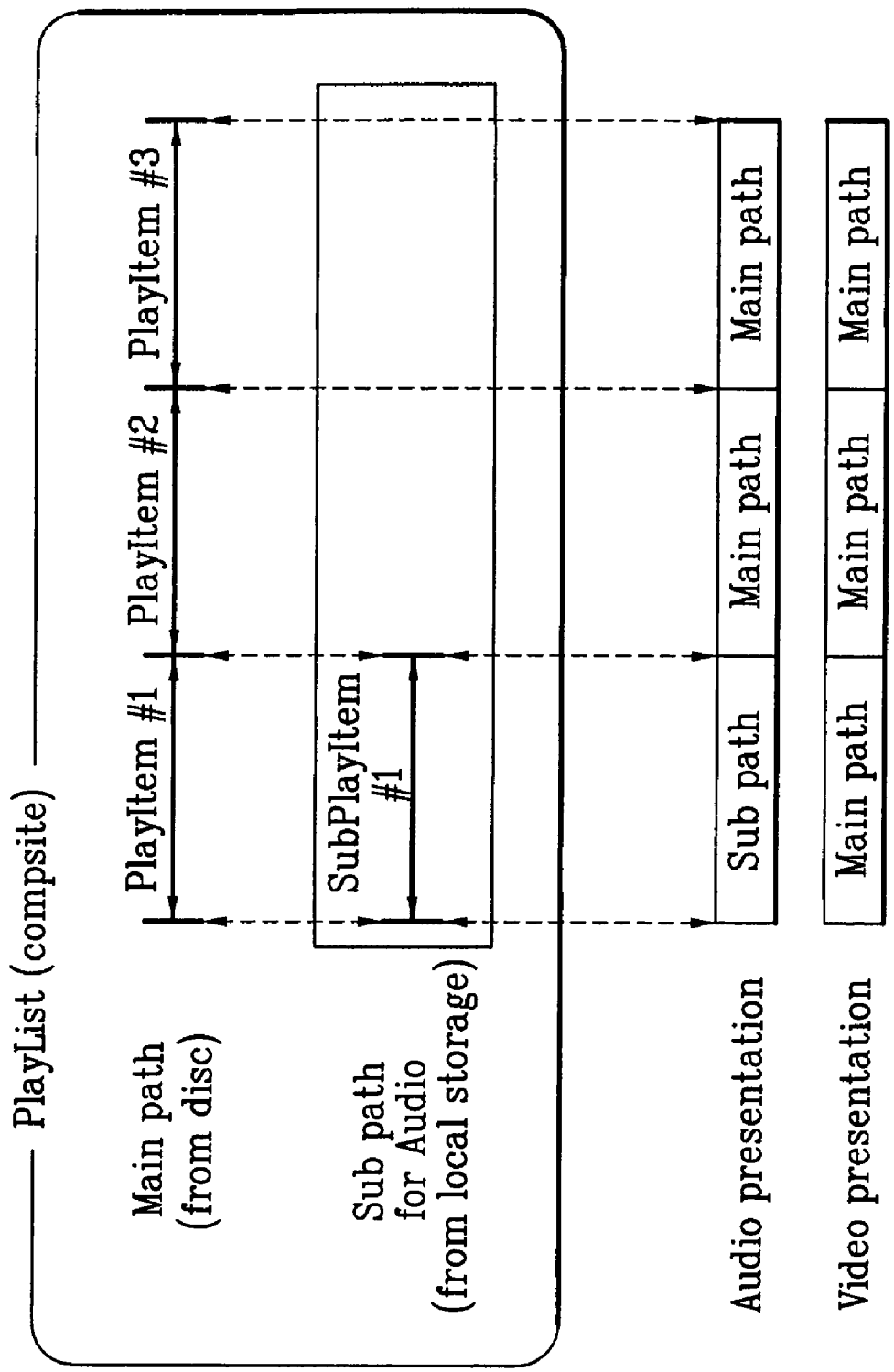

Referring to FIG. 6B, in configuring the SubPlayItem within the sub path, the SubPlayItem, which is matched by one-to-one correspondence with each PlayItem within the main path, is configured independently. However, a matching SubPlayItem may not exist for all of the PlayItems. In other words, by designating a SubPlayItem corresponding to a specific PlayItem within the PlayList, only the main audio stream that is included in the main clip and designated by the specific PlayItem may be replaced with the auxiliary audio stream that is included in the sub clip and designated by the corresponding SubPlayItem.

Therefore, when reproducing the optical disc using the above-described composite PlayList, the video signal is reproduced from the main video stream recorded within the disc. And, when a SubPlayItem exists in accordance with a sub path, the audio signal is reproduced from the auxiliary video stream recorded in the local storage 15. However, when the SubPlayItem does not exist, the optical disc is reproduced from the main audio stream that is included in the main path and designated by the PlayItem. In other words, a section of the main audio stream within the optical disc is replaced with the auxiliary audio stream stored in the local storage 15.

Figure 6C:
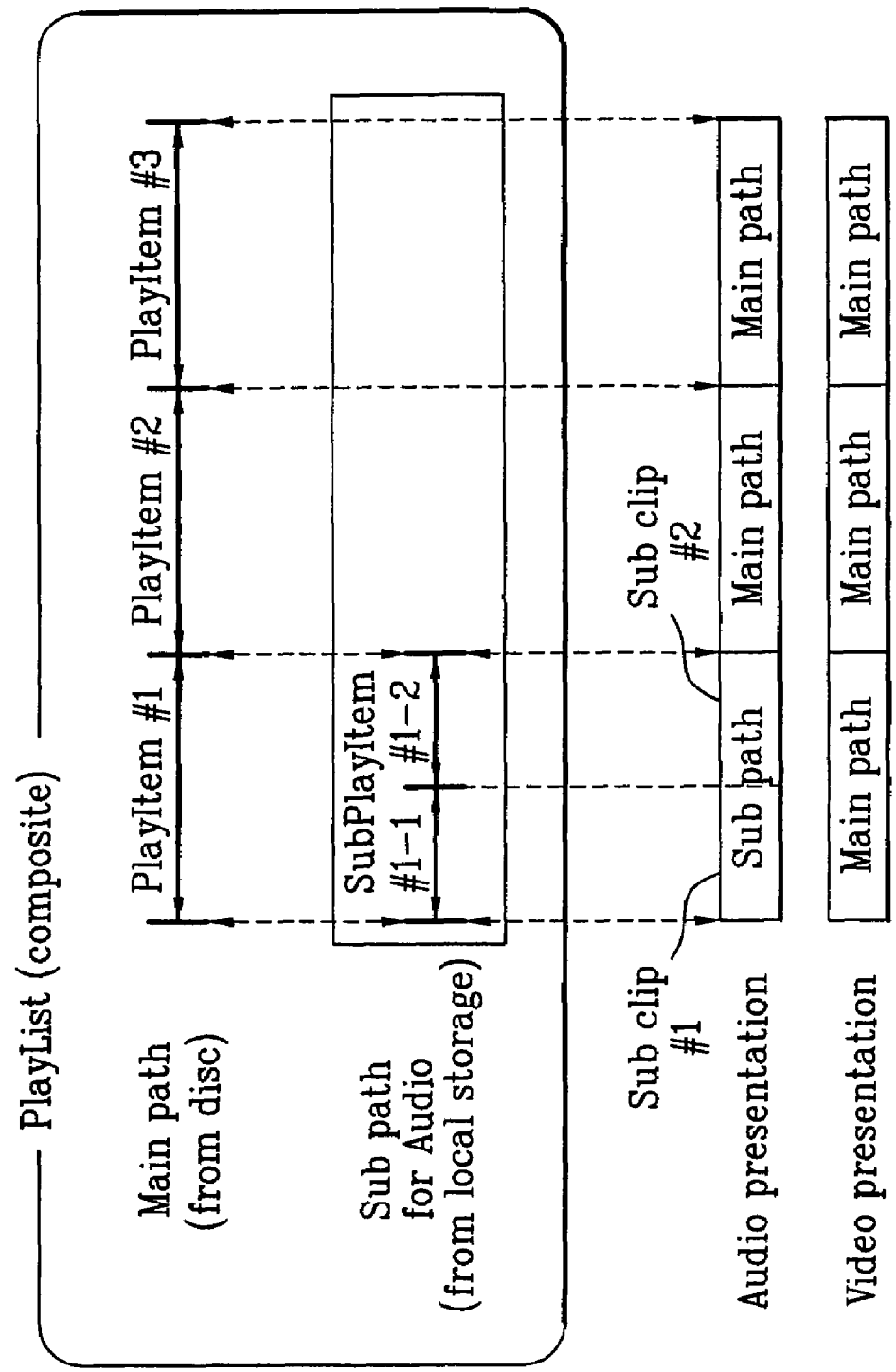

Referring to FIG. 6C, in configuring the SubPlayItem within the sub path, the SubPlayItem, which is matched by one-to-one correspondence with each PlayItem within the main path, is configured independently. However, a plurality of matching SubPlayItems may exist for a single PlayItem. In other words, in FIG. 6A and FIG. 6B, one matching SubPlayItem exists for each PlayItem. Conversely, in FIG. 6C, a plurality of matching SubPlayItems exists for one PlayItem. Herein, FIG. 6C only illustrates an example for a single PlayItem (PlayItem #1). However, it is apparent that this aspect of the present invention can be identically applied to other PlayItems (PlayItem #2, PlayItem #3) as well.

More specifically, by designating a plurality of SubPlayItems corresponding to the specific PlayItem within the PlayList, the main audio stream that is included in the main clip and designated by PlayItem may be replaced with the auxiliary audio stream that is included in the plurality of sub clips and designated by the corresponding plurality of SubPlayItems. For example, a main audio signal that is reproduced by PlayItem #1 may be reproduced by being replaced with two auxiliary audio signals for each section, both signals having a different attribute (e.g., language). Therefore, when reproducing the optical disc using the above-described composite PlayList, the video signal is reproduced from the main video stream which is recorded in the optical disc, and, when a SubPlayItem exists in accordance with a sub path, the audio signal is reproduced from the auxiliary audio stream that is recorded in the local storage 15. However, when the SubPlayItem does not exist, the audio signal is reproduced from the main audio stream that is included in the main clip and designated by the PlayItem.

Figure 6D:
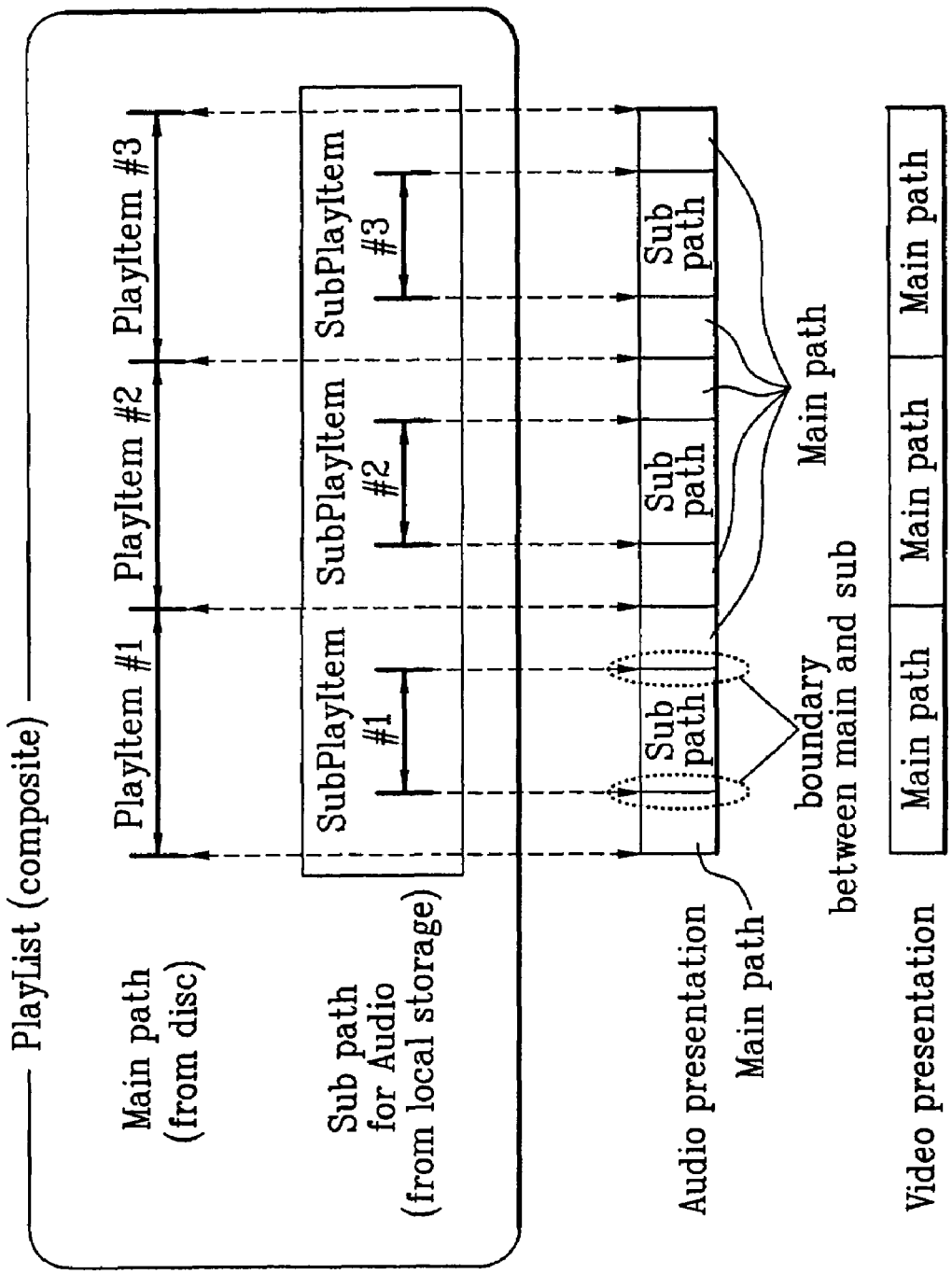

Referring to FIG. 6D, in configuring the SubPlayItem within the sub path, the SubPlayItem matching with each PlayItem within the main path, is configured independently. However, the SubPlayItems that match with a PlayItem may exist only in a partial section among the entire section that is reproduced by the PlayItem. More specifically, in FIG. 6A, FIG. 6B, and FIG. 6C, one or more SubPlayItems matches with one entire PlayItem section. However, in FIG. 6D, the SubPlayItem corresponding to one PlayItem exists only in a partial section. In other words, by designating the SubPlayItem corresponding to a specific PlayItem included a PlayList during only a partial section, the entire section that is reproduced by the corresponding PlayItem includes each of a main audio stream that is included in the main clip and designated by the PlayItem, and an auxiliary audio stream that is included in the sub clip and designated by the SubPlayItem. For example, the main audio signal and the auxiliary audio signal having a different attribute (e.g., language) in only part of the entire section, which is reproduced by PlayItem #1, is reproduced.

Therefore, when reproducing the optical disc using the above-described composite. PlayList, the video signal is reproduced from the main video stream recorded within the disc, and part (or a partial section) of the entire presentation section of the audio signal, which is reproduced by a specific PlayItem, is reproduced from the auxiliary audio stream that is recorded in the local storage 15 and designated by the SubPlayItem within the sub path. In this case, since the reproduction section (or presentation section) of the SubPlayItem within the sub path is not required to be identical with the PlayItem within the main path, the SubPlayItem can apply the auxiliary audio stream more diversely. However, in this case, a boundary between the reproduction (or presentation) of the main clip and the reproduction (or presentation) of the sub clip is created. Herein, the main clip is reproduced by a PlayItem (e.g., PlayItem #1), and then, the reproduction of the main clip is changed to the reproduction of the sub clip. At this point, the system needs to be supported so that a seamless presentation can be performed between the audio streams even at the boundary.

Figure 6E:
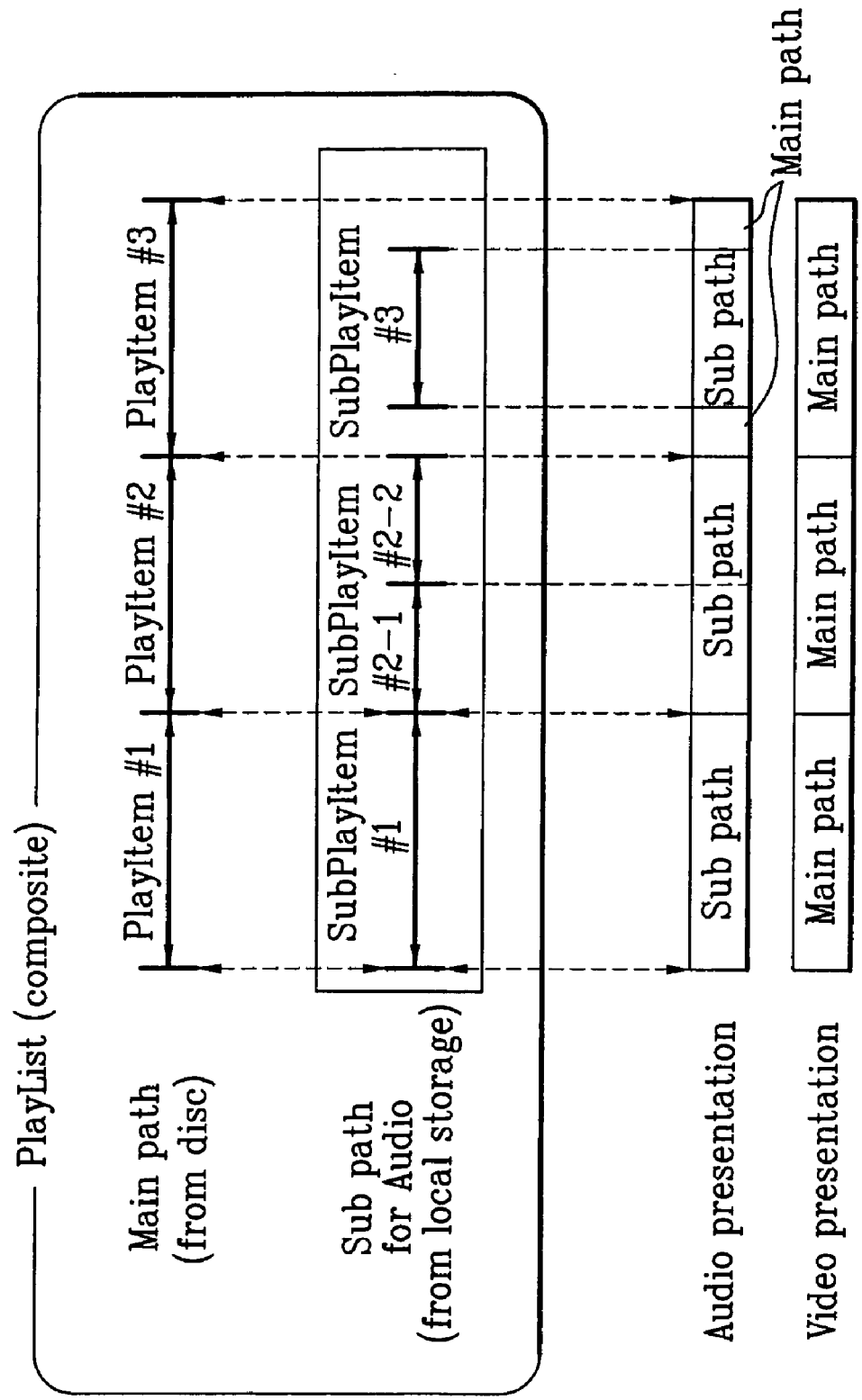

Referring to FIG. 6E, in configuring the SubPlayItem within the sub path, the SubPlayItem, which is matching with each PlayItem within the main path, is configured independently. However, each of the SubPlayItems is matched with its respective PlayItem by different methods. More specifically, in FIG. 6E, the examples of configuring the SubPlayItem as shown in FIGS. 6A to 6D can be applied to each PlayItem. For example, the method of replacing the entire section of PlayItem #1 with a SubPlayItem (as shown in FIG. 6A or FIG. 6B), the method of replacing the entire section of PlayItem #2 with a plurality of SubPlayItems (as shown in FIG. 6C), and the method of replacing only part of the entire section of PlayItem #3 with a SubPlayItem (as shown in FIG. 6D) are all applied in FIG. 6E. Accordingly, it is apparent that the composite PlayList can be reproduced (or presented) in accordance with the methods shown in FIG. 6A to 6D for each PlayItem.

FIGS. 7A to 7D illustrate examples of configuring a Sub-Path, among the methods of configuring the reproduction management files according to the present invention. Accordingly, the method for configuring a SubPlayItem within the sub path may be applied to any one of the examples shown in FIGS. 6A to 6E. However, in case of FIG. 7D, a new method for configuring the SubPlayItem is illustrated, which will be described in detail in a later process.

Figure 7A:
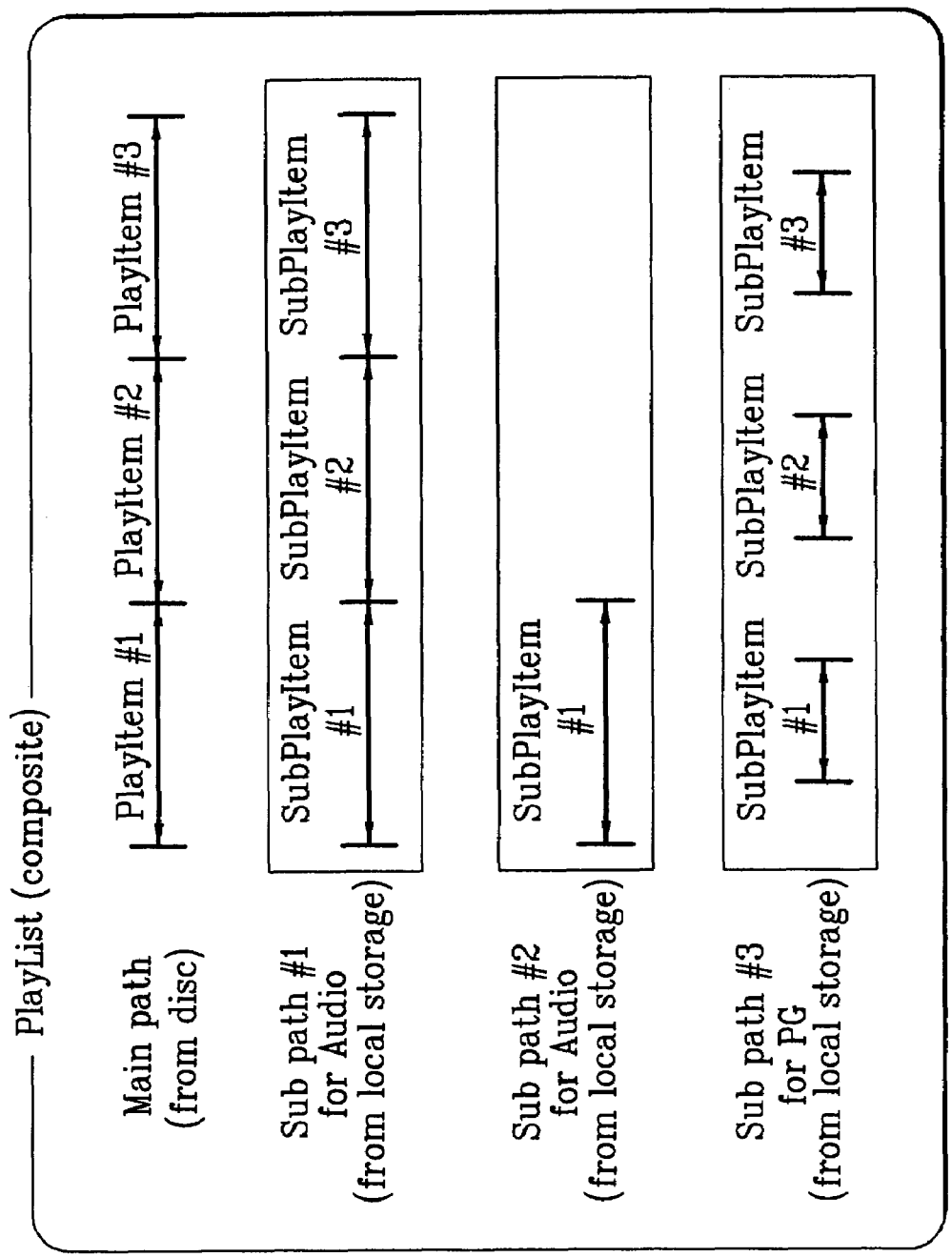
FIGS. 7A to 7D illustrate examples of configuring a SubPath, among the methods of configuring the reproduction management files according to the present invention.

Referring to FIG. 7A, in configuring the sub path for the sub data, a sub path is configured for each auxiliary data stream. For example, the sub paths may be configured so that Sub path #1 designates Auxiliary Audio stream #1, Sub path #2 designates Auxiliary Audio stream #2, and Sub path #3 designates the Auxiliary Presentation Graphic stream. Therefore, when the above-described composite PlayList is reproduced, one of Sub path #1 and Sub path #2, which designates the same auxiliary stream file stored in the local storage 15, is selected and reproduced along with the main data that is recorded within the disc and designated by the main path. Herein, Sub path #3 which designates the Auxiliary Presentation Graphic stream may also be reproduced.

Figure 7B:
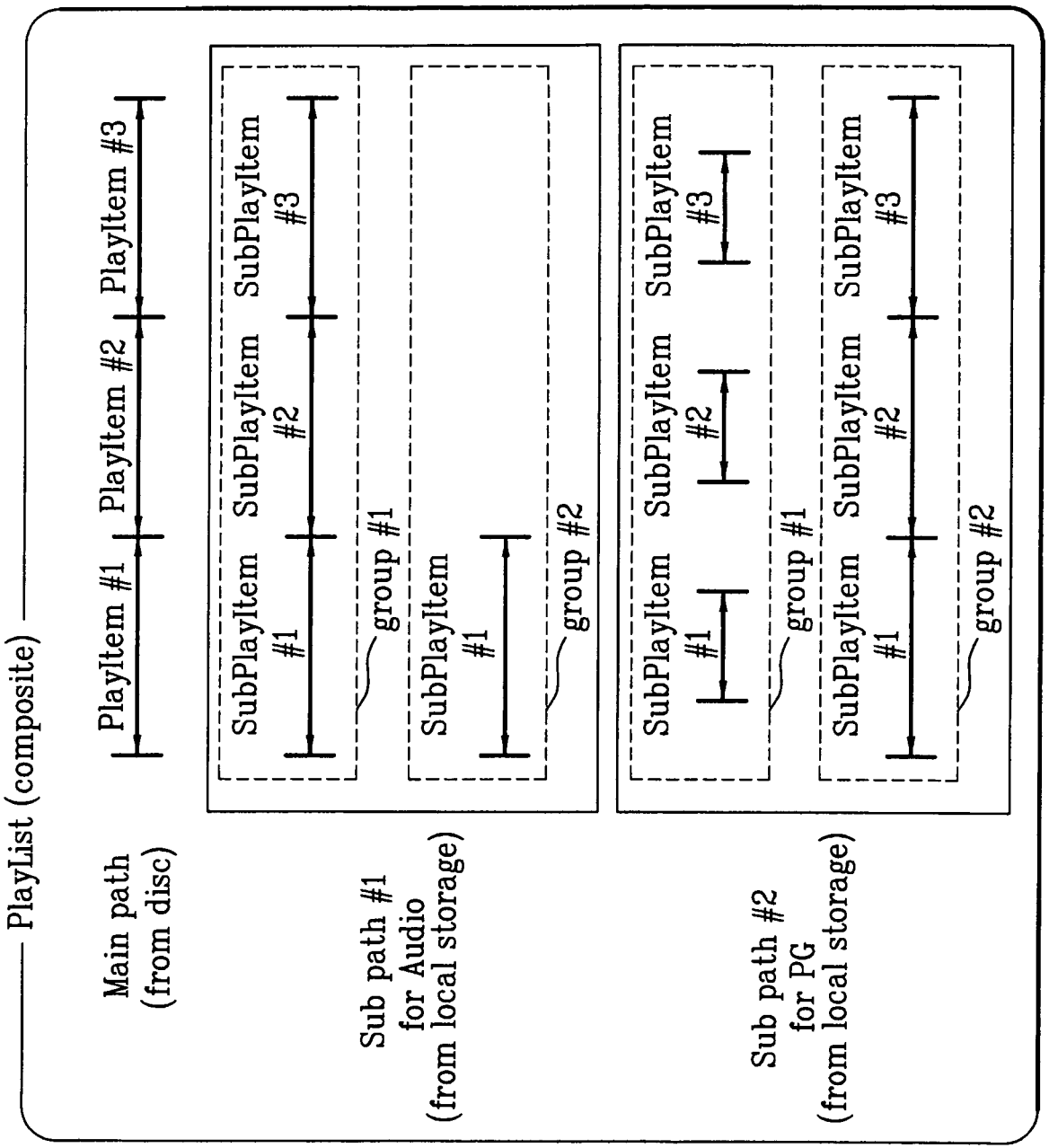

Referring to FIG. 7B, in configuring the sub path for the sub data, a sub path is configured for each auxiliary data stream attribute. For example, Sub path #1 is configured to designate the auxiliary audio stream. Therefore, the corresponding Sub path #1 designates and manages all of the sub data, which is stored in the local storage 15 and corresponds to the same disc, having the auxiliary audio stream attribute. More specifically, Auxiliary Audio stream #1 is defined and managed as group #1, and Auxiliary Audio stream #2 is defined and managed as group #2. Similarly, Sub path #2 is configured to designate the auxiliary presentation graphic (PG) stream. Therefore, the corresponding Sub path #2 designates and manages all of the sub data, which is stored in the local storage 15 and corresponds to the same disc, having the auxiliary presentation graphic (PG) stream attribute. More specifically, Auxiliary Presentation Graphic (PG) stream #1 is defined and managed as group #1, and Auxiliary Presentation Graphic (PG) stream #2 is defined and managed as group #2. Therefore, when the above-described composite PlayList is reproduced, each of Sub path #1 and Sub path #2, which designates the sub data stored in the local storage 15, is reproduced along with the main data that is recorded within the disc and designated by the main path. However, when reproducing Sub path #1 and Sub path #2, one of group #1 and group #2 designated within each sub path may be selectively reproduced.

Figure 7C:
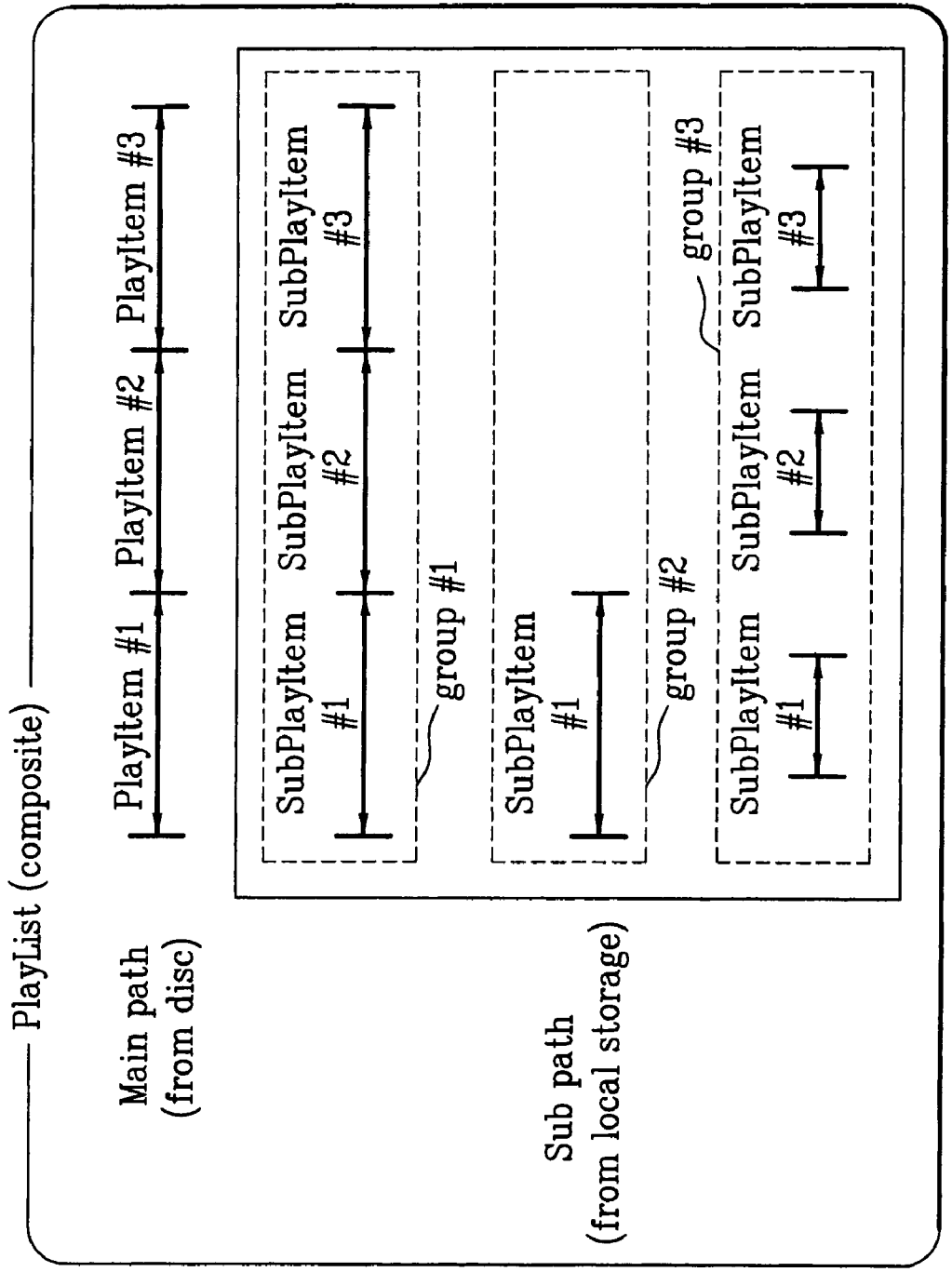

Referring to FIG. 7C, in configuring the sub path for the sub data, a plurality of auxiliary data streams may be configured in a single sub path. More specifically, a sub path is configured for reproducing the sub data stored in the local storage 15, and a plurality of groups is formed for each auxiliary data stream within the corresponding sub path. For example, group #1 may be defined to be related with Auxiliary Audio stream #1, group #2 may be defined to be related with Auxiliary Audio stream #2, and group #3 may be defined to be related with Auxiliary Presentation Graphic (PG) stream. Therefore, when the above-described composite PlayList is reproduced, the sub path designating the sub data stored in the local storage 15 is reproduced along with the main data that is recorded within the disc and designated by the main path. However, when reproducing the sub path, one of group #1, group #2, and group #3 may be selectively reproduced.

Figure 7D:
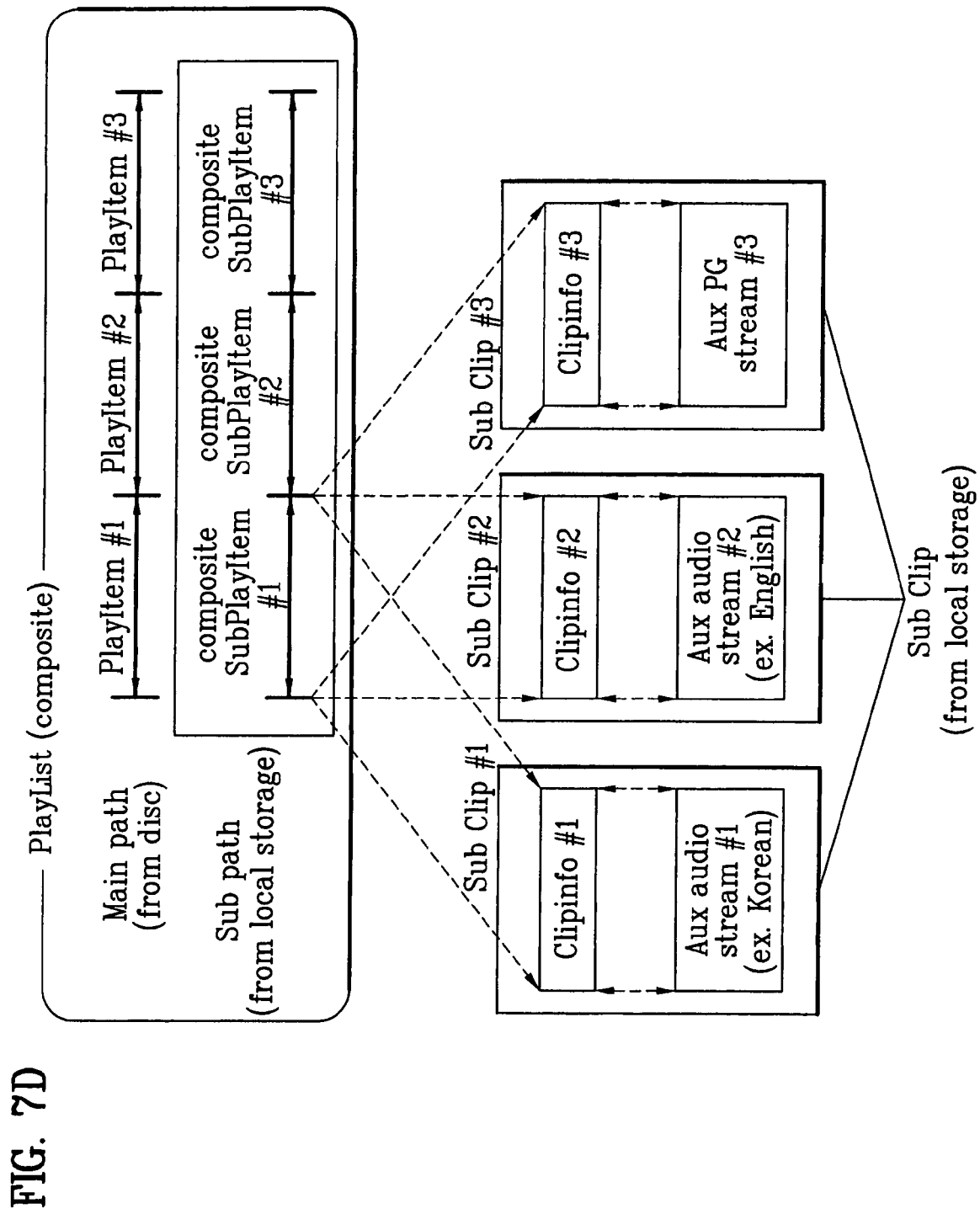

Referring to FIG. 7D, in configuring the sub path for the sub data, a plurality of auxiliary data streams may be configured in a single sub path. Herein, a composite SubPlayItem for reproducing the sub data is created within the sub path. More specifically, a sub path is configured for reproducing the sub data stored in the local storage 15, and a composite SubPlayItem (composite SubPlayItem #1, #2, #3) matching with each of the PlayItems (PlayItems #1, #2, #3) within the main path is created within the corresponding sub path. Herein, each of the composite SubPlayItems compositely manages at least one of the auxiliary data streams that is to be reproduced with the corresponding PlayItem.

For example, the composite SubPlayItem #1 includes information for reproducing Sub clip #1, Sub clip #2, and Sub clip #3. Herein, each of Sub clip #1, Sub clip #2, and Sub clip #3 reproduces Auxiliary Audio stream #1, Auxiliary Audio stream #2, and Auxiliary Presentation Graphic (PG) stream, respectively, which are stored in the local storage 15. All of Sub clip #1, Sub clip #2, and Sub clip #3 are reproduced simultaneously or selectively with the main clip that is designated by PlayItem #1. Although, the method of configuring each of composite SubPlayItem #2, and composite SubPlayItem #3 is not illustrated in FIG. 7D, it will be apparent that the composite SubPlayItems may be configured by using the same method as that of composite SubPlayItem #1.

Figure 8A:
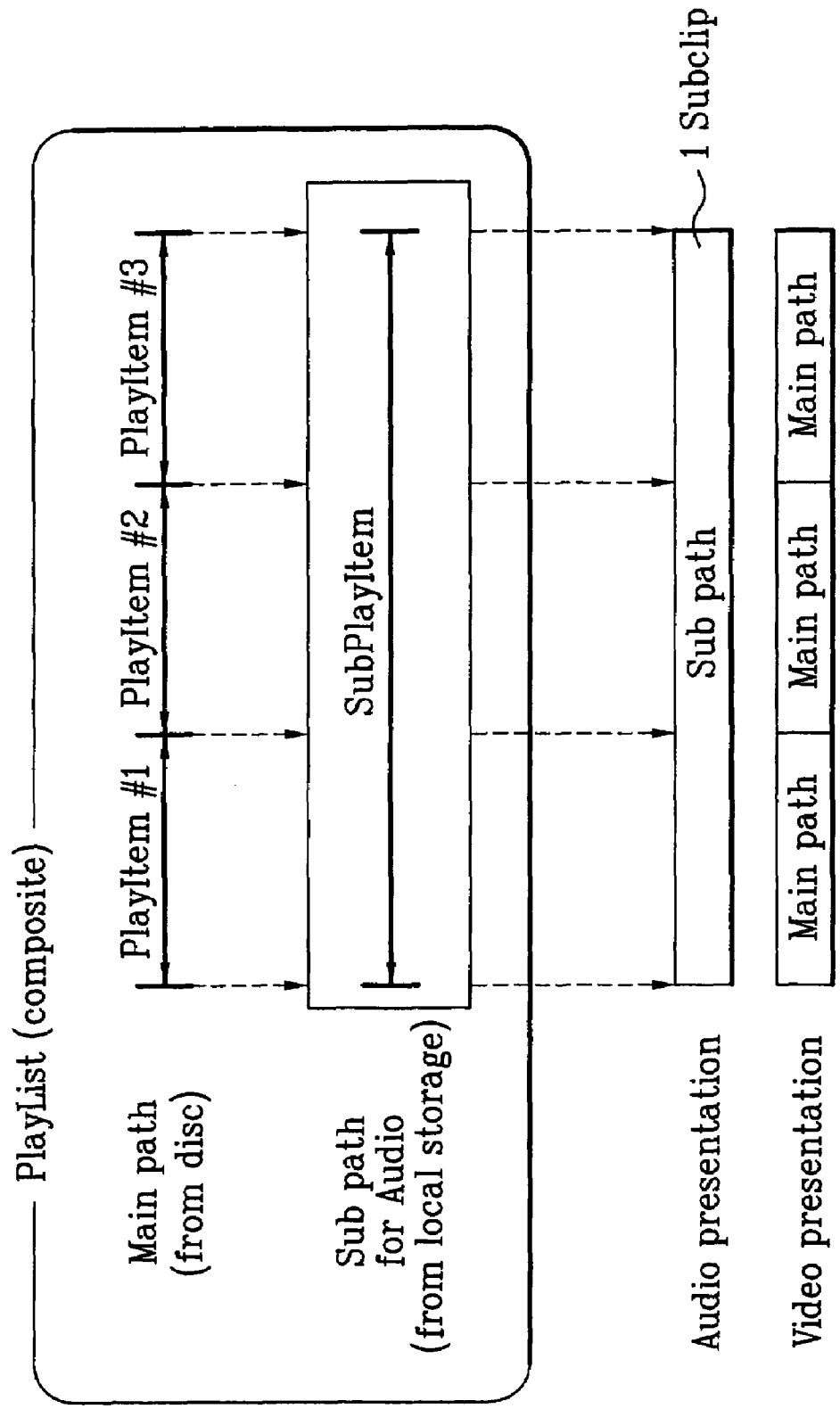
FIGS. 8A to 8C illustrate other examples of configuring a SubPlayItem, among the methods of configuring the reproduction management files according to the present invention.
Figure 8B:
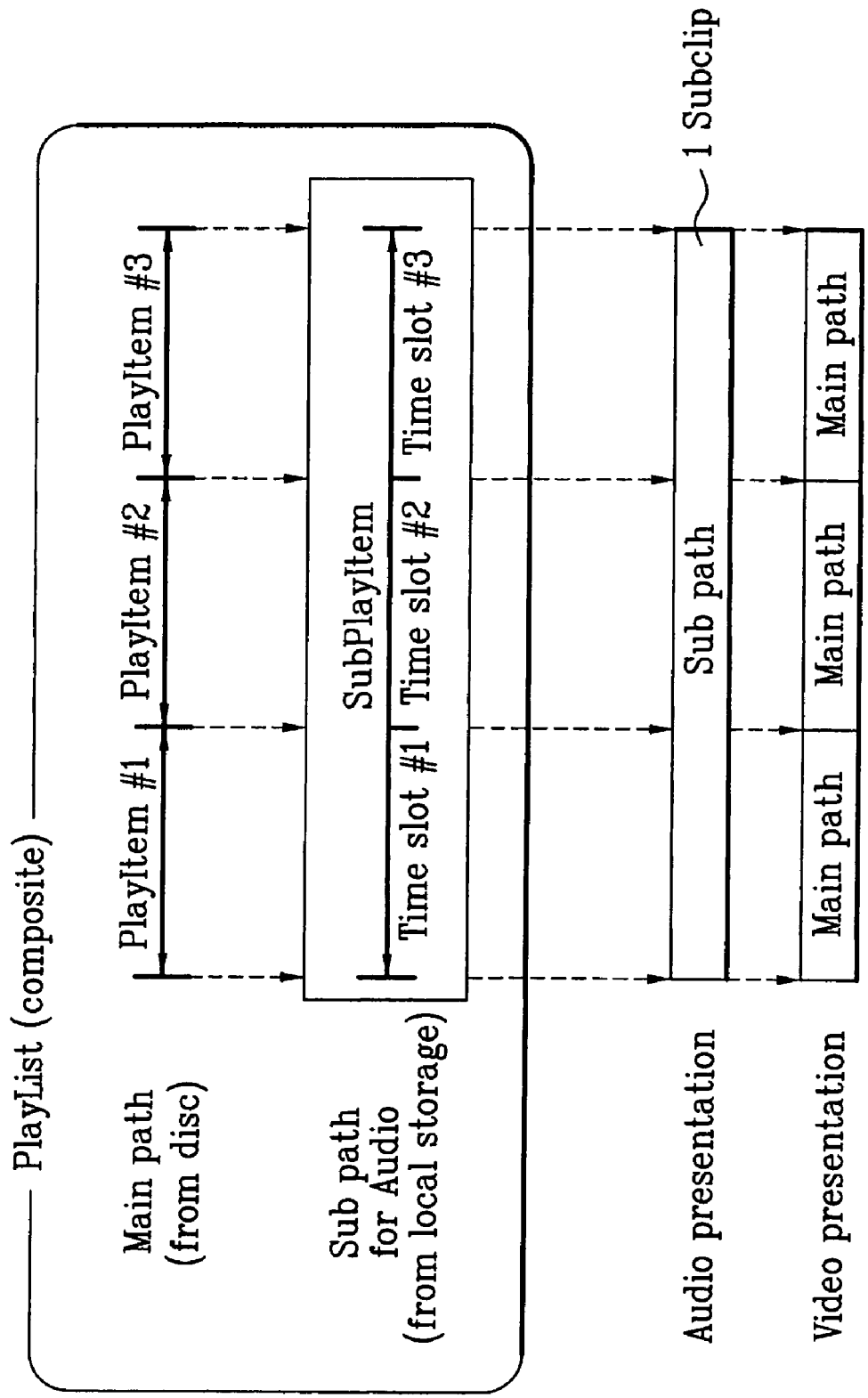
Figure 8C:
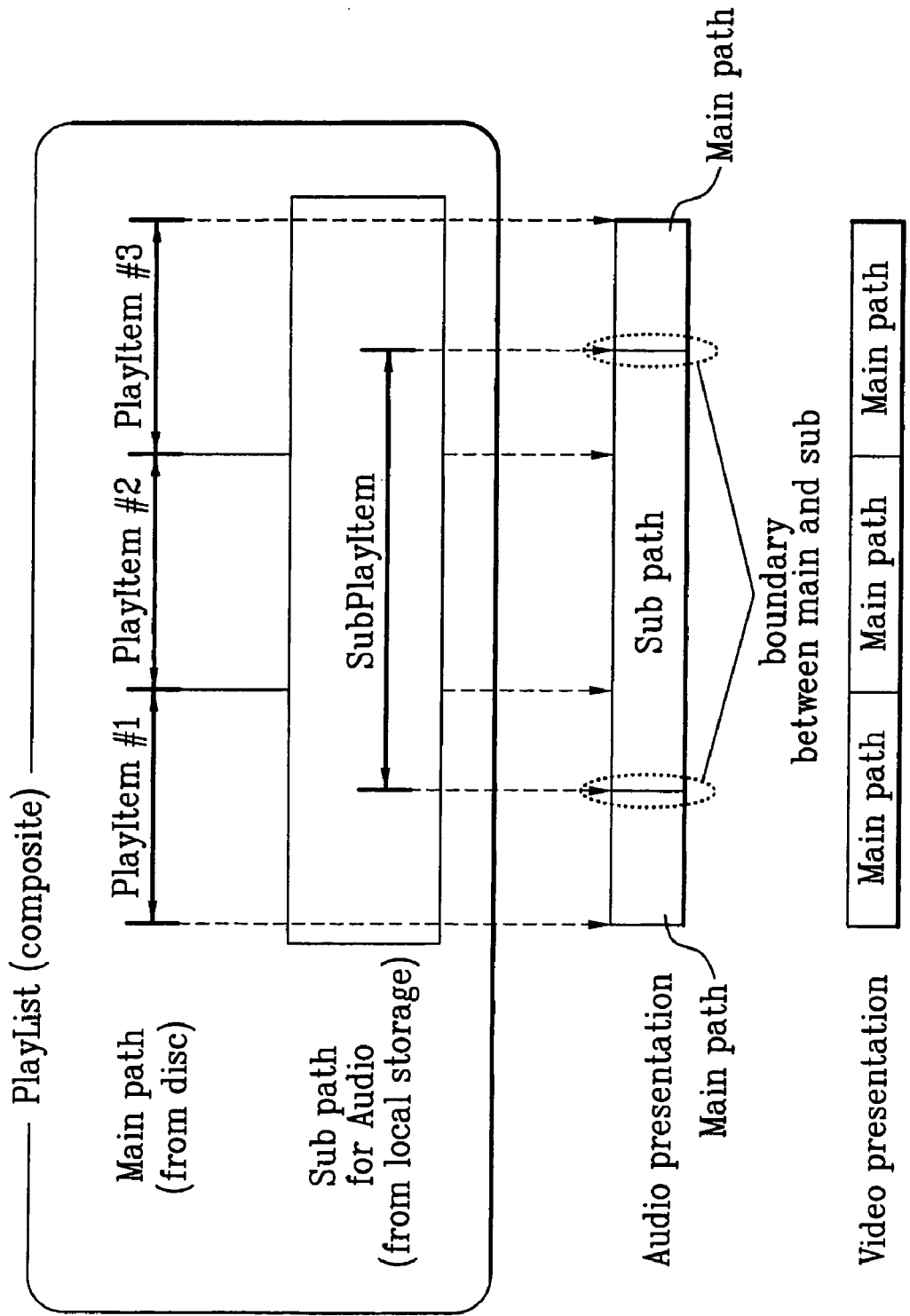

FIGS. 8A to 8C and FIGS. 9A to 9D illustrate embodiments of the SubPlayItem being associated with the entire section of the PlayItem, among the method of configuring the composite PlayList. Accordingly, FIGS. 8A to 8C illustrate examples of configuring a SubPlayItem, among the methods of configuring the composite PlayList according to the present invention. Referring to FIG. 8A, in configuring the SubPlayItem within the sub path, a SubPlayItem matching with the entire section of the PlayList is configured independently. More specifically, by designating a SubPlayItem that simultaneously corresponds to all PlayItems within the PlayList, the main audio streams included in the main clip and designated by each PlayItem may be replaced with the auxiliary audio stream included in a single sub clip and designated by a corresponding single SubPlayItem. Thus, the system can be simplified. Therefore, when reproducing the optical disc using the above-described composite PlayList, the video signal is reproduced from the main video stream recorded within the disc, and the audio signal is reproduced from the auxiliary audio stream that is recorded in the local storage 15. In other words, the main audio stream recorded within the optical disc is replaced with one auxiliary audio stream stored in the local storage 15.

Referring to FIG. 8B, in configuring the SubPlayItem within the sub path, a SubPlayItem matching with t h e entire section of the PlayList is configured independently. Herein, a presentation section is chronologically defined within the SubPlayItem. More specifically, in case of FIG. 8A, a SubPlayItem includes an In-time and an Out-time. However, in case of FIG. 8B, a SubPlayItem includes a plurality of In-times and Out-times. Accordingly, each section defined as an In-time and an Out-time is referred to as a "time slot". For example, FIG. 8B illustrates three time slots "Time slot #1", "Time slot #2", and "Time slot #3" included in a SubPlayItem. The time slot may be created from a random section. However, the time slot may also be matched with PlayItem #1, PlayItem #2, and PlayItem #3 within the main path.

Therefore, when reproducing the optical disc using the above-described composite PlayList, the video signal is reproduced from the main video stream recorded within the disc, and the audio signal is reproduced from the auxiliary audio stream that is recorded in the local storage 15. However, reproduction (or presentation) is performed in accordance with the In-time and Out-time designated by each of Time slot #1, #2, and #3. In other words, the main audio stream recorded on the optical disc is replaced with an auxiliary audio stream stored in the local storage 15.

Referring to FIG. 8C, in configuring the SubPlayItem within the sub path, a SubPlayItem matching with only a partial section of the entire PlayList section is configured independently. More specifically, part of the entire main data presentation section reproduced (or presented) by the PlayList is replaced with the sub data. For example, part of the entire section that is reproduced by the composite PlayList reproduces the main audio signal, and another part of the entire section reproduces the auxiliary audio signal. Therefore, when reproducing the optical disc using the above-described composite PlayList, the video signal is reproduced from the main video stream recorded within the optical disc. When reproducing the audio signal, part of the entire section of the audio signal reproduced by the composite PlayList is reproduced from the main audio stream within the main path. And, another part of the audio signal is reproduced from the auxiliary audio stream recorded in the local storage 15 and designated by the SubPlayItem.

In this case, since the reproduction section (or presentation section) of the SubPlayItem within the sub path is not required to be identical with the PlayItem within the main path, the SubPlayItem can apply the auxiliary audio stream more diversely. However, in this case, a boundary between the reproduction (or presentation) of the main clip and the reproduction (or presentation) of the sub clip is created. Herein, the main clip is changed to the reproduction of the sub clip during the reproduction of the main clip. At this point, the system needs to be supported so that a seamless presentation can be performed between the audio streams even at the boundary. Accordingly, the Time slot applied in FIG. 8B may also be identically applied in FIG. 8C.

FIGS. 9A to 9D illustrate examples of configuring a Sub-Path, among the methods of configuring the reproduction management files according to the present invention. Accordingly, the method for configuring a SubPlayItem within the sub path may be applied to any one of the examples shown in FIGS. 8A to 8C. However, in case of FIG. 9D, a new method for configuring the SubPlayItem is illustrated, which will be described in detail in a later process. Accordingly, apart from the structure of the SubPlayItem within the sub path, the structure of the sub path is identical as those described in FIGS. 7A to 7D.

Referring to FIG. 9A, in configuring the sub path for the sub data, a sub path is configured for each auxiliary data stream. For example, the sub paths may be configured so that Sub path #1 designates Auxiliary Audio stream #1, Sub path #2 designates Auxiliary Audio stream #2, and Sub path #3 designates the Auxiliary Presentation Graphic stream. Therefore, when the above-described composite PlayList is reproduced, one of Sub path #1 and Sub path #2, which designates the same auxiliary stream file stored in the local storage 15, is selected and reproduced along with the main data that is recorded within the disc and designated by the main path. Herein, Sub path #3 which designates the Auxiliary Presentation Graphic stream may also be reproduced.

Referring to FIG. 9B, in configuring the sub path for the sub data, a sub path is configured for each auxiliary data stream attribute. For example, Sub path #1 is configured to designate the auxiliary audio stream. Therefore, the corresponding Sub path #1 designates and manages all of the sub data, which is stored in the local storage 15 and corresponds to the same disc, having the auxiliary audio stream attribute. More specifically, Auxiliary Audio stream #1 is defined and managed as group #1, and Auxiliary Audio stream #2 is defined and managed as group #2. Similarly, Sub path #2 is configured to designate the auxiliary presentation graphic (PG) stream. Therefore, the corresponding Sub path #2 designates and manages all of the sub data, which is stored in the local storage 15 and corresponds to the same disc, having the auxiliary presentation graphic (PG) stream attribute. More specifically, Auxiliary Presentation Graphic (PG) stream #1 is defined and managed as group #1, and Auxiliary Presentation Graphic (PG) stream #2 is defined and managed as group #2. Therefore, when the above-described composite PlayList is reproduced, each of Sub path #1 and Sub path #2, which designates the sub data stored in the local storage 15, is reproduced along with the main data that is recorded within the disc and designated by the main path. However, when reproducing Sub path #1 and Sub path #2, one of group #1 and group #2 designated within each sub path may be selectively reproduced.

Referring to FIG. 9C, in configuring the sub path for the sub data, a plurality of auxiliary data streams may be configured in a single sub path. More specifically, a sub path is configured for reproducing the sub data stored in the local storage 15, and a plurality of groups is formed for each auxiliary data stream within the corresponding sub path. For example, group #1 may be defined to be related with Auxiliary Audio stream #1, group #2 may be defined to be related with Auxiliary Audio stream #2, and group #3 may be defined to be related with Auxiliary Presentation Graphic (PG) stream. Therefore, when the above-described composite PlayList is reproduced, the sub path designating the sub data stored in the local storage 15 is reproduced along with the main data that is recorded within the disc and designated by the main path. However, when reproducing the sub path, one of group #1, group #2, and group #3 may be selectively reproduced.

Figure 9D:
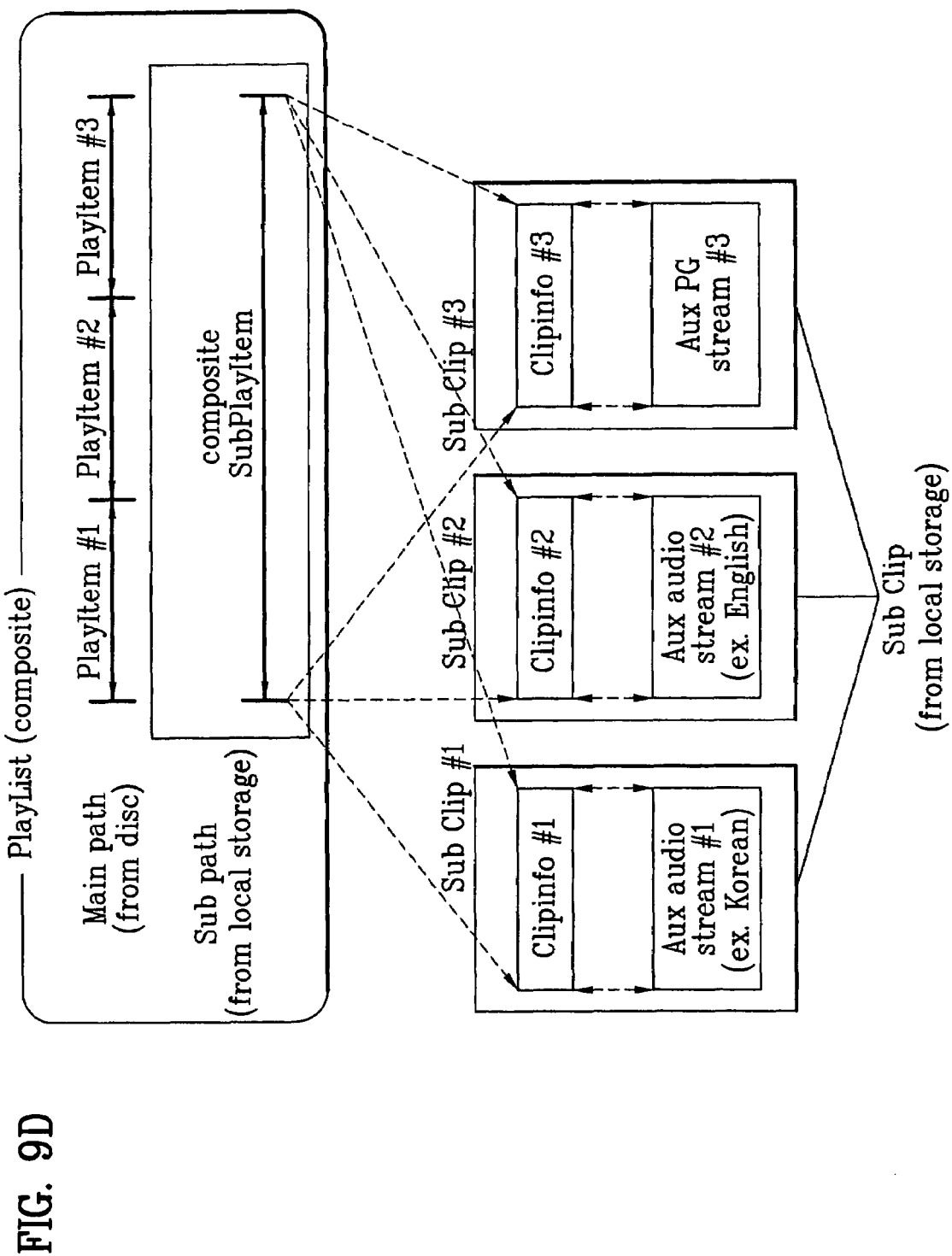

Referring to FIG. 9D, in configuring the sub path for the sub data, a plurality of auxiliary data streams may be configured in a single sub path. Herein, a composite SubPlayItem for reproducing the sub data is created within the sub path. More specifically, a sub path is configured for reproducing the sub data stored in the local storage 15, and a composite SubPlayItem (composite SubPlayItem #1) corresponding to a reproduction time (or presentation time) within the main path is created within the corresponding sub path. The composite SubPlayItem includes information for reproducing Sub clip #1, Sub clip #2, and Sub clip #3. Herein, each of Sub clip #1, Sub clip #2, and Sub clip #3 reproduces Auxiliary Audio stream #1, Auxiliary Audio stream #2, and Auxiliary Presentation Graphic (PG) stream, respectively, which are stored in the local storage 15. Sub clip #1, Sub clip #2, and Sub clip #3 are reproduced simultaneously or selectively with a main clip that is designated by each of PlayItem #1, PlayItem #2, and PlayItem #3.

FIGS. 10A to 10F illustrate syntaxes of the composite PlayList file for reproducing the sub data stored in the local storage 15 by each hierarchy. FIG. 10A illustrates the syntax of a header portion of the PlayList file (xxxxx.mpls). An identification information, such as an "MPLS" character code, identifying the current file as a PlayList file is recorded in a "type_indicator" field. Information indicating the version of the PlayList file is recorded in a "version_number" field. A position information indicating at which position a "PlayListo" field starts is recorded in a "PlayList_start_address" field, and a position information indicating at which position a "PlayListMark( )" field starts is recorded in a "PlayListMark_start_address" field. In addition, the PlayList file (xxxxx.mpls) includes an "AppInfoPlayList( )" field, a "PlayList( )" field, and a "PlayListMark( )" field. The "AppInfoPlayList( )" field includes information on the reproduction (or playback) method (i.e., PlayList_playback_type). The "PlayList( )" field includes PlayItem information and Sub path information, and the "PlayListMark( )" field includes a mark pointer which is used for special reproduction (or playback). A detailed description of the "PlayList( )" field according to the present invention will now follow.

FIG. 10B illustrates a header syntax of the "PlayList( )" field included in the PlayList file. Herein, information on the size of the "PlayList( )" field is recorded in a "length" field. Information on the number of PlayItems included in the PlayList file is recorded in a "number_of_PlayItem" field, and information on the number of sub paths included in the PlayList file is recorded in a "number_of_SubPaths" field. Accordingly, "PlayItem( )" fields and "SubPath( )" fields are created based upon the above-described number information. The "PlayItem( )" field includes an "STN_table( )" field, wherein all of the stream information that can be used in the corresponding PlayItem. When reproducing the "PlayItem( )"field and the "SubPath( )" field associated thereto, the optical recording and/or reproducing apparatus 10 may select and reproduce a stream information defined within the "STN_table( )" field. Therefore, all of the above-described stream information (shown in FIG. 6A to FIG. 9D) are recorded in the "STN_table( )" field.

Hereinafter, the syntax for the "STN_table( )" field within the "PlayItem( )" field will be described in detail with reference to FIGS. 10C and 10E, and the syntax for the "SubPath( )" field will be described in detail with reference to FIG. 10F. FIG. 10C illustrates a header syntax of the "STN_table( )" field included in the "PlayItem( )" field. More specifically, a size information of the "STN_table( )" field is recorded in a "length" field. The number of reproduceable video streams that are associated with the PlayItem is recorded in a "number_of_video_stream_entries" field, and the number of reproduceable audio streams that are associated with the PlayItem is recorded in a "number_of_audio_stream_entries" field. The number of reproduceable text subtitle streams that are associated with the PlayItem is recorded in a "number_of_PG_textST_stream_entries" field. And, finally, the number of reproduceable interactive graphic streams that are associated with the PlayItem is recorded in a "number_of_IG_stream_entries" field. The stream information is recorded in accordance with the above-described number information for each corresponding field. However, each of the stream information respectively recorded to a "stream_entry( )" field and a "stream_attributes( )" field. Herein, stream type, main clip information, and sub clip information are recorded in the "stream_entry( )" field, and attribute information of each stream is recorded in the "stream_attributes( )" field.

FIG. 10D illustrates a syntax of a "stream_entry( )" field, which is included in the "STN_table( )" field. More specifically, a size information of the "stream_entry( )" field is recorded in a "length" field, and a source information of the corresponding stream is recorded in a "type" field. For example, type "1" represents a stream type that is included in the main clip and designated by the PlayItem. Type "2" represents a stream type that is designated by the sub path and recorded within the optical disc. And, type "3" represents a stream type that is designated by the sub path and stored in the local storage 15. Therefore, when the type of the current "stream_entry( )" field is "1", a Packet ID (PID) information of the corresponding main clip is recorded in a "ref_to_stream_PID_of_mainclip" field. And, when the type of the current "stream_entry( )" field is "2" or "3", a Packet ID (PID) information of the corresponding sub clip is recorded in a "ref_to_stream_PID_of_subclip" field. Evidently, when a plurality of sub paths is included, an identification information of the corresponding sub path is recorded in a "ref_to_SubPath_id" field, and an identification information of the corresponding sub clip is recorded in a "ref_to_Subclip_entry_id" field.

FIG. 10E illustrates a syntax of a "stream_attributes( )" field, which is included in the "STN_table( )" field. More specifically, a size information of the "stream_attributes( )" field is recorded in a "length" field, and information of a stream type is recorded in a "stream_coding_type" field. For example, "stream_coding_type=0x02" represents a video stream (most particularly, an MPEG2 video stream), and an attribute information is recorded in a "frame_rate" field. In addition, "stream_coding_type=0x80 or 0x81 or 0x82" represents an audio stream that is coded to various types. Herein, the attribute information includes an "audio_presentation_type", wherein information on the number of channels when reproducing (or presenting) the audio stream is recorded, and an "audio_language_code" field, wherein a language information of the audio stream is recorded.

Furthermore, "stream_coding_type=0x90" represents a presentation graphic stream. The attribute information includes a "PG_language_code", wherein information of the language used in the presentation graphic is recorded. Also, "stream_coding_type=0x91" represents an interactive graphic stream. The attribute information includes an "IG_language_code", wherein information of the language used in the interactive graphic is recorded. Finally, "stream_coding_type=0x92" represents a text subtitle stream. The attribute information includes a "textST_language_code", wherein information of the language used in the text subtitle is recorded, and a "character_code" field, wherein information of the character code used in the text subtitle is recorded. Accordingly, only a limited type of attribute information for each stream is illustrated in FIG. 10E. However, it is apparent that a wider range of attribute information may be included in each stream type.

FIG. 10F illustrates a header syntax of a "SubPath( )" field that is included in the "PlayList( )" field. More specifically, a size information of the "SubPath ( )" field is recorded in a "length" field, and information of a stream type is recorded in a "stream_coding_type" field, and a source information of the corresponding sub path is recorded in a "SubPath_type" field. For example, when SubPath_type "n" represents the sub path recorded within the optical disc, and SubPath_type "m" represents the sub path stored in the local storage 15.

Depending upon the embodiment, a plurality of sub paths may be configured for each stream attribute (e.g., as shown in FIG. 7A, FIG. 7B, FIG. 9A, and FIG. 9B). In this case, the sub paths types are described in more detail. More specifically, SubPath_type "n1" or "m1" may represent the audio stream, SubPath_type "n2" or "m2" may represent the text subtitle stream, SubPath_type "n3" or "m3" may represent the interactive graphic stream, and SubPath_type "n4" or "m4" may represent the presentation graphic stream. Additionally, a flag information indicating whether sub path presentation is to be repeated or not is recorded in a "is_repeat_SubPath" field. The number of SubPlayItems included in the sub path is recorded in a "number_of_SubPlayItems" field. Information corresponding to each SubPlayItem is recorded in a "SubPlayItem( )" field.

FIG. 10G illustrates a syntax of a "SubPlayItemo" field, which is included in the "SubPath( )" field. More specifically, a size information of the "SubPlayItem( )" field is recorded in a "length" field, the name of a sub clip that is stored in the local storage 15 and managed by the corresponding SubPlayItem is recorded in a "Clip_information_file_name" field, and an STC_id within the designated sub clip is recorded in a "ref_to_STC_id" field. In addition, a presentation start time (IN_time) and a presentation end time (OUT_time) performed by the corresponding SubPlayItem is respectively recorded in a "SubPlayItem_IN_time (1, 2, . . . , k)" field and a "SubPlayItem_OUT_time (1, 2, . . . , k)" field. If a SubPlayItem includes more than one "Time_slot", as shown in FIG. 8B, then a presentation start time (IN_time) and a presentation end time (OUT_time) are required for each "Time_slot". Therefore, a plurality of "SubPlayItem_IN_time" fields and "SubPlayItem_OUT_time" fields should be included in the "SubPlayItem( )" field. Furthermore, a PlayItem identification information (e.g., PlayItem #1, PlayItem #2, PlayItem #3) associated with the presentation start of the SubPlayItem is recorded in a "sync_PlayItem_id" field. Information associated with the presentation start time of the SubPlayItem is recorded in a "sync_start_PTS_of_PlayItem" field. More specifically, when the presentation of the PlayItem reaches a specific time designated by the identification information recorded in the "sync_PlayItem_id" field, information for staring presentation of the SubPlayItem is recorded in the "sync_start_PTS_of_PlayItem" field. In other words, since the information of the "sync_PlayItem_id" field associated with the PlayItem and the information of the "sync_start_PTS_of_PlayItem" field associated with the PlayItem are synchronized, the PlayItem and the SubPlayItem can be matched with one another.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of reproducing data from a computer readable medium, the method comprising:
   reproducing, by a reproducing apparatus, first data recorded on the computer readable medium and second data stored in a local storage using a PlayList file which includes a main path and at least one sub path;
   wherein the main path includes at least one PlayItem for play-back of the first data, the sub path includes at least one SubPlayItem for play-back of the second data in association with the play-back of the first data, and each of the at least one PlayItem includes a stream information table (STN table) field defining stream information of the first data and the second data.

2. The method of claim 1, wherein a playing interval of the SubPlayItem coincides with an entire portion of a playing interval of the PlayItem.

3. The method of claim 1, wherein a playing interval of the SubPlayItem coincides with a selected portion of a playing interval of the PlayItem.

4. The method of claim 3, wherein a sub clip allocated to the selected portion and a main clip allocated to a remaining portion of the playing interval of the PlayItem are presented seamlessly.

5. The method of claim 1, wherein the SubPlayItem is synchronized with the PlayItem.

6. The method of claim 1, wherein the second data further includes additional audio data.

7. The method of claim 6, wherein the PlayItem is further configured to play-back original audio data recorded on the computer readable medium, and the additional audio data replaces the original audio data.

8. The method of claim 6, wherein the PlayItem is further configured to play-back original audio data recorded on the computer readable medium, and the additional audio data appends to the original audio data.

9. The method of claim 1, wherein the second data further includes presentation graphic data.

10. The method of claim 1, wherein the PlayList file further includes sub path type information identifying a type of the sub path.

11. The method of claim 1, wherein the PlayList file further includes stream type information distinguishing the first data and the second data from each other.

12. An apparatus for reproducing data from a computer readable medium, the apparatus comprising:
   a pick-up unit configured to read first data recorded on the computer readable medium;
   a local storage configured to store second data associated with the first data, the second data including a stream file; and
   a decoder configured to decode the first data and the second data using a PlayList file which includes a main path and a sub path,
   wherein the main path includes at least one PlayItem for play-back of the first data, and the sub path includes at least one SubPlayItem associated with the PlayItem for play-back of the second data in association with the play-back of the first data, and the PlayItem includes a stream information table (STN table) field defining stream information of the first data and the second data.

13. The apparatus of claim 12, wherein the PlayList file is stored in the local storage.

14. The apparatus of claim 12, wherein the PlayList file is recorded on the computer readable medium.

15. The apparatus of claim 12, wherein the second data further includes additional audio data.

16. The apparatus of claim 12, wherein the second data further includes presentation graphic data.

* * * * *